United States Patent
Yoshida

(10) Patent No.: US 6,970,637 B1
(45) Date of Patent: Nov. 29, 2005

(54) INFORMATION PROCESSING APPARATUS, METHOD FOR THE SAME, AND STORAGE MEDIUM

(75) Inventor: Shigeo Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/408,446

(22) Filed: Sep. 29, 1999

(30) Foreign Application Priority Data

Sep. 30, 1998 (JP) ............................. 10-278630
Sep. 30, 1998 (JP) ............................. 10-278631

(51) Int. Cl.$^7$ ........................ H04N 5/91; H04N 5/225; H04N 7/08
(52) U.S. Cl. ........................ 386/46; 386/117; 386/92
(58) Field of Search ........................ 386/46, 83, 117, 386/107, 1, 52, 4, 38, 92; 358/906, 909.1; 348/222.1, 231.1, 231.3; H04N 5/91, 5/255, 7/08

(56) References Cited

U.S. PATENT DOCUMENTS 5,812,746 A   9/1998   Mishima et al. ............ 395/113

2002/0188796 A1 * 12/2002 Suzuki

FOREIGN PATENT DOCUMENTS

| EP | 0 709 843 | 5/1996 |
|---|---|---|
| EP | 0 823 816 | 2/1998 |
| EP | 0 905 966 | 3/1999 |

* cited by examiner

Primary Examiner—Robert Chevalier
(74) Attorney, Agent, or Firm—Fitzpatrick, Cella, Harper & Scinto

(57) ABSTRACT

An apparatus for processing information is provided, such as a digital camera having a communication function with improved performance while retaining compactness and immediate functionality. A size of data (first data) expected to be received is added to an expected size of second data to be entered (for example, an expected size of image data obtained in a predetermined photography image-quality mode), so that a resultant sum is compared to an amount of a remaining storage capacity of a memory (storage medium), and if that sum is larger than the calculated remaining storage capacity, the apparatus sends a direction (instruction) indicating that the data expected to be received should be sent (transferred) to a predetermined transmission destination. In this manner, the first data is not received, that is, the first data is sent (redirected) to a predetermined transmission destination.

28 Claims, 26 Drawing Sheets

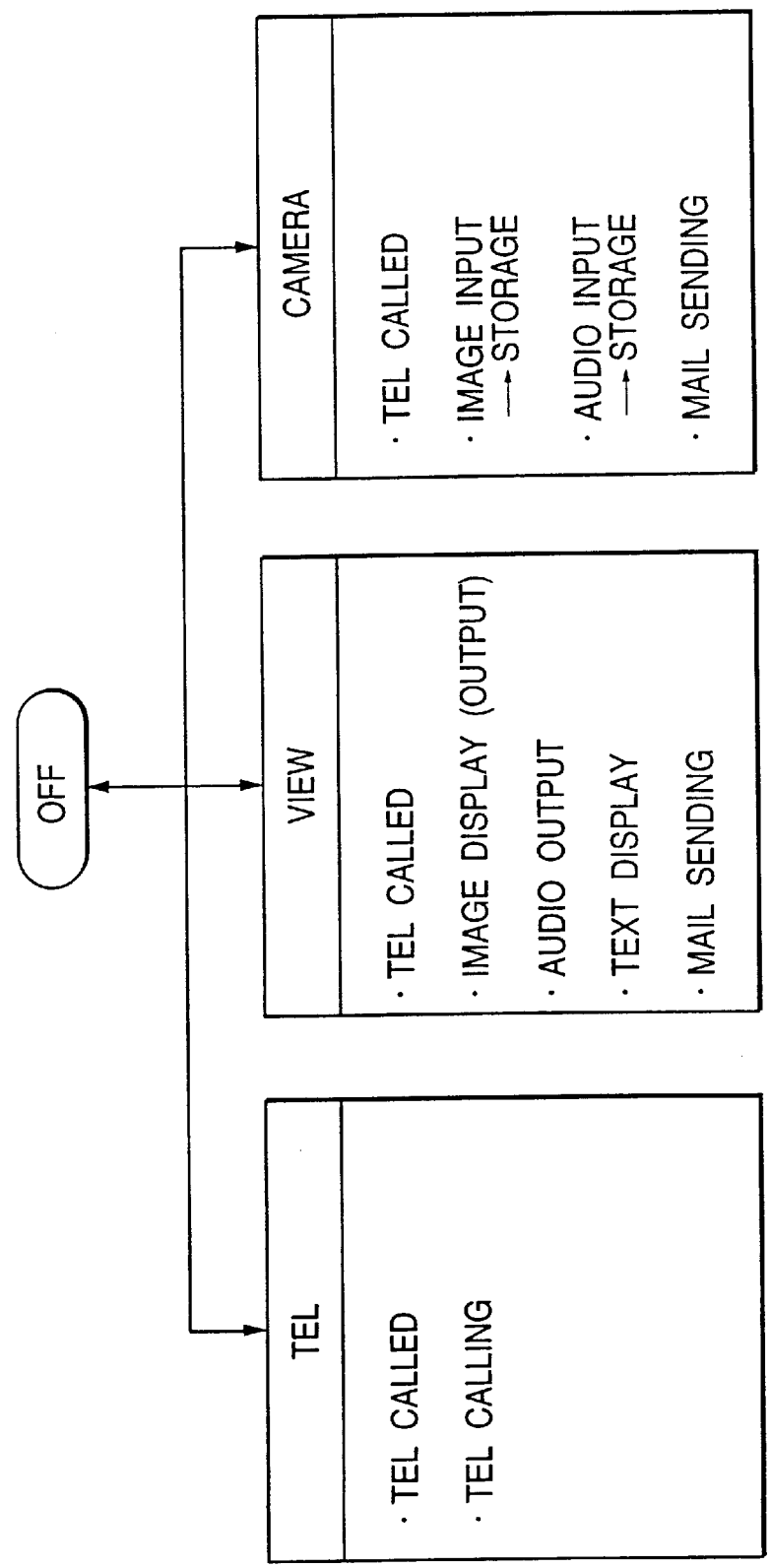

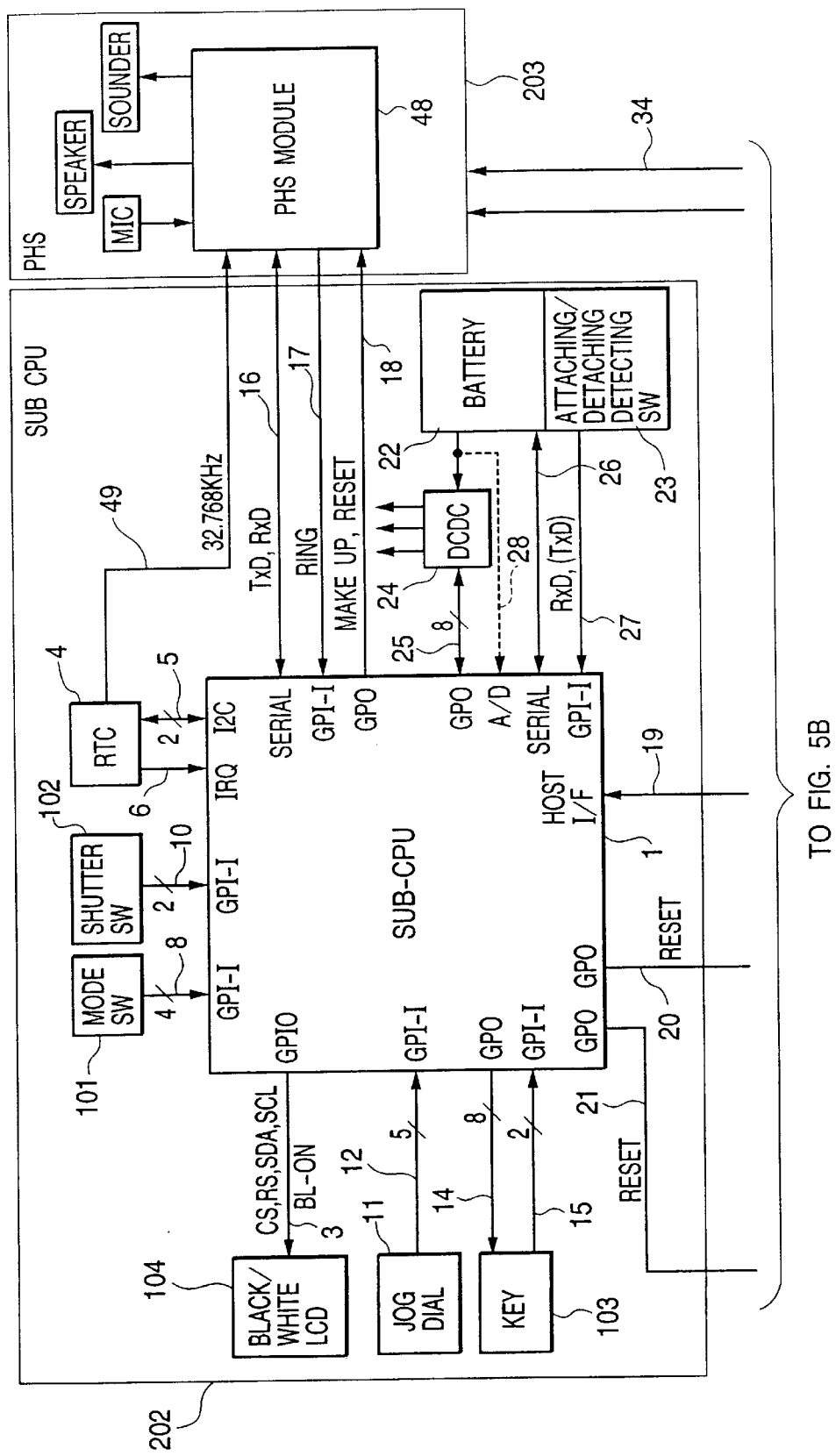

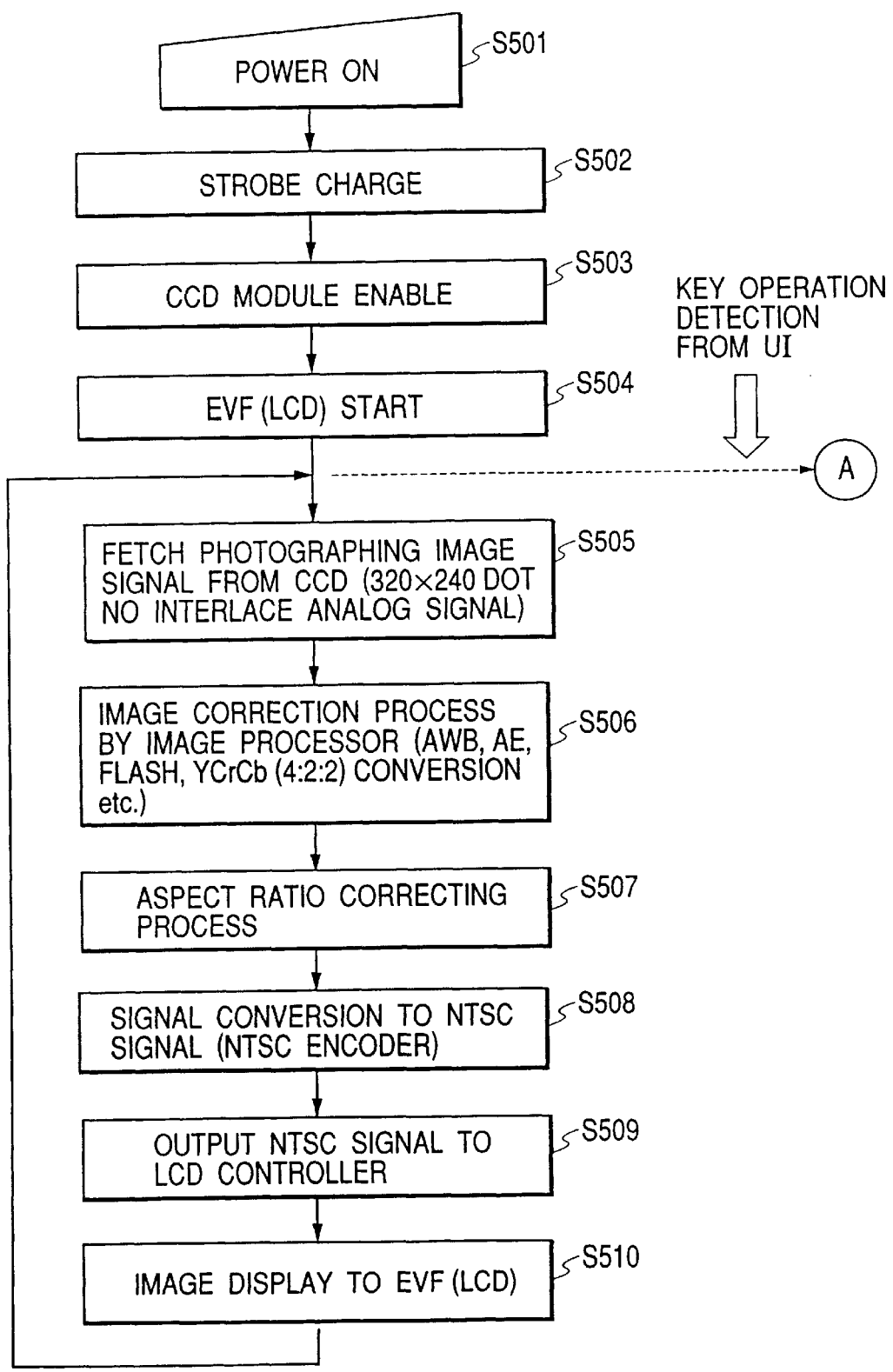

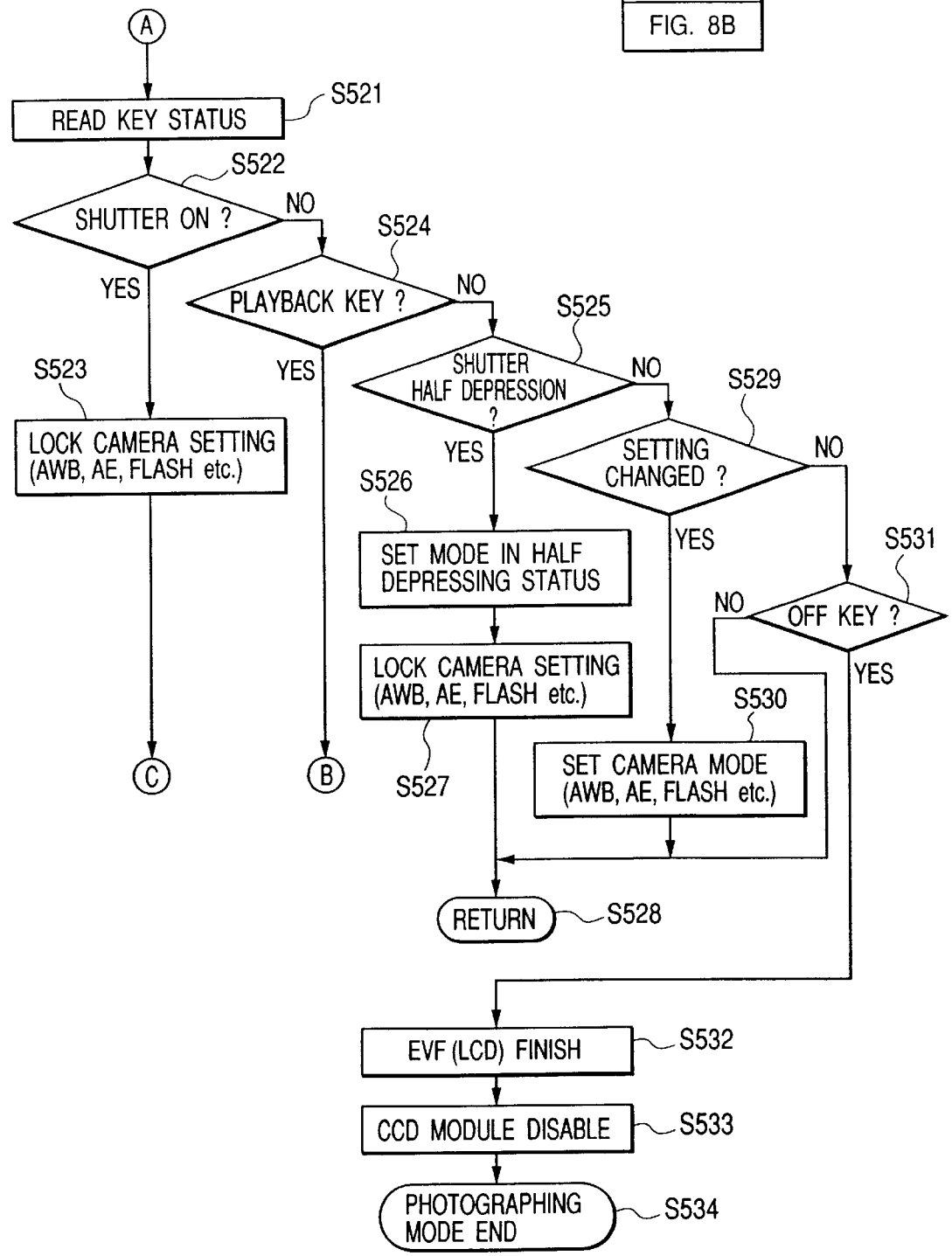

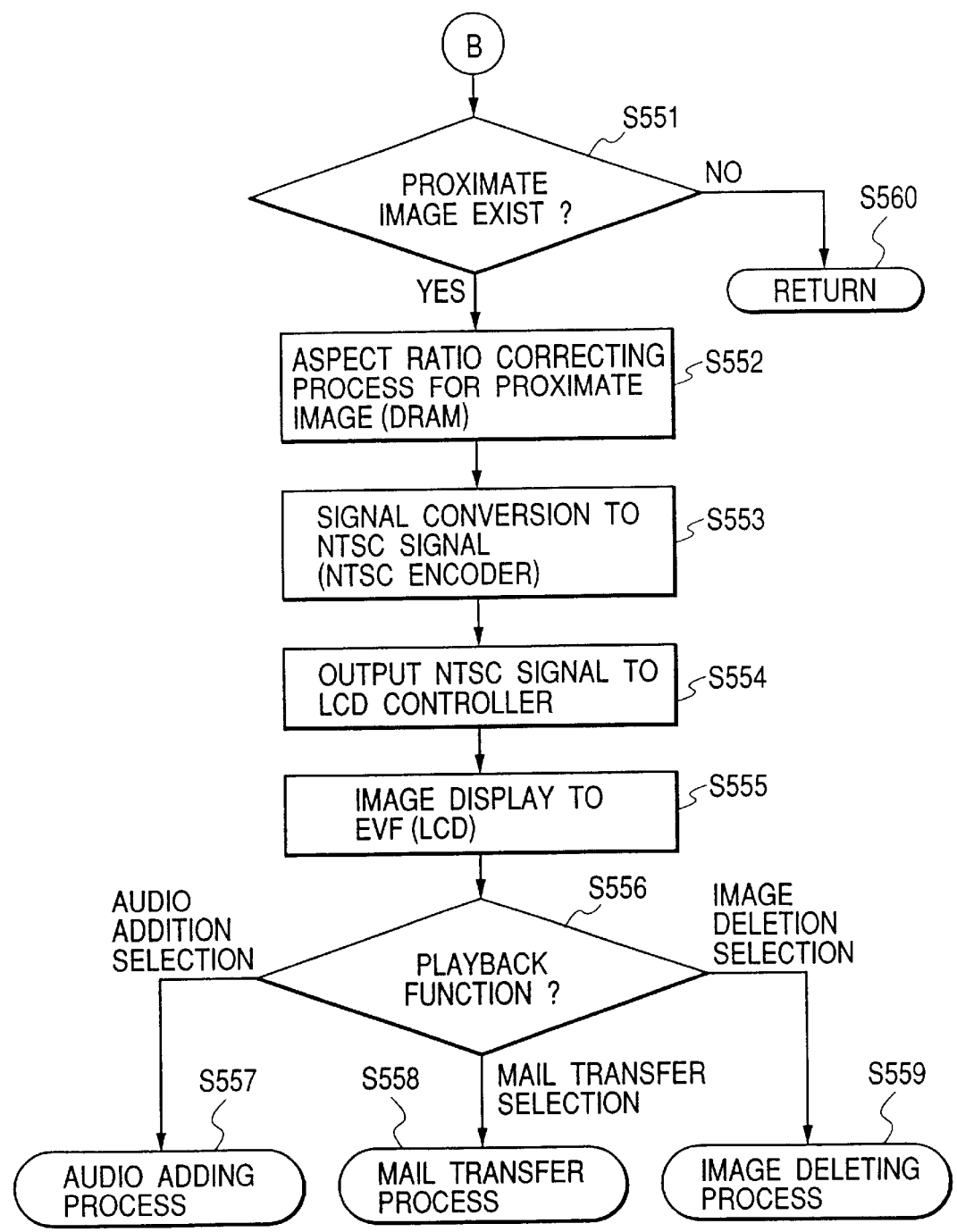

INFORMATION PROCESSING APPARATUS, METHOD FOR THE SAME, AND STORAGE MEDIUM

BACKGROUND OF THE INVENTION

1. Field of the Invention

The present invention relates to an information processing method, an apparatus for the same, and a storage medium which stores computer readable process steps that can be applied to digital cameras, and the like, provided with a communication function.

2. Related Background Art

Recent years have seen dramatic advances in digital cameras promoted by improvements in the technologies of semiconductors, etc. A digital camera digitizes photographed images and stores the results into an image memory, which is provided in a semiconductor memory in many cases.

Semiconductor memories, however, are very expensive, so that, taking into consideration the overall costs of the digital camera, the capacity of its semiconductor memory is limited. That is, the number of photographs that can be taken is also limited. Presently, the capacity of a semiconductor memory for use in digital cameras on a standard basis is not sufficient with respect to a photographing frequency generally required for camera equipment.

To overcome this drawback, a digital camera is marketed in which the image memory used is a replaceable store device, such as a PCMCIA flash memory card or a smart memory, to permit the user to replace it as required, thus increasing the number of photographs that can be taken.

The availability of flash memory cards or smart memories, however, is very low as compared to silver salt films, so that it is not always possible for the user to have such an image memory at hand when necessary. The user, therefore, must anticipate beforehand the number of photographs to be taken and add a sufficient margin to that number for PCMCIA flash memory cards or smart media to be carried. This situation cannot be said to utilize efficiently the feature of using replaceable storage devices as the image memory.

On the other hand, another image memory which may be used is a magnetic memory, such as a hard disc, instead of semiconductor memories, to assure a sufficient number of photographs that can be taken with respect to a photographing frequency generally required for digital cameras.

However, even with a magnetic memory employed as the image memory, its memory capacity is not infinite. That is, it is limited. Moreover, a magnetic memory requires larger power dissipation and also larger dimensions of its equipment body. Magnetic memories, therefore, are not appropriate as the image memory of camera equipment, which needs to be portable.

As mentioned above, conventional digital cameras have been limited in terms of the number of photographs that can be taken due to the limited capacity of the built-in image memory and the poor availability of replaceable storage devices. With this in mind, when one wants to take photographs in excess of a limited number, one must, for example, at a photographing site, erase unnecessary photographs of those already stored in the image memory, or transfer already photographed images to a storage device in a personal computer, to increase the usable capacity of the image memory.

The above-mentioned work, however, if carried out at a photographing site wastes time, bringing about a large drawback for digital cameras which are required to be used immediately.

Specifically, to erase unnecessary images already photographed, various types of information must be confirmed to decide which images are unnecessary. The confirmation work places a heavy burden on the photographer if it is carried out with a digital camera, which has a relatively low processing speed compared to a personal computer. In particular, the quality of photographed images are rather difficult to judge with a small-sized display generally provided on the digital camera.

Furthermore, the above-mentioned confirmation work requires for its effective use the mounting of new groups of dedicated-use operation switches and information-confirmation displays. This situation prevents the miniaturization of digital cameras.

Moreover, it is a psychological burden for the photographer to erase his photographed images at site, thus bringing about a strong resistance to him psychologically.

When photographed images are transferred to a storage device in the personal computer, on the other hand, the above-mentioned psychological burden is not present. However, the photographer has to carry with him an interface, etc., between the digital camera and the personal computer, thus creating physical burdens.

To solve the above-mentioned problems, it has been suggested that the digital camera be, for example, provided with a communication function to send and receive photographed images and E-mails as required.

However, even in a configuration in which a digital camera is provided with a communication function, if the photographed images and the received data are stored in the same memory, collision occurs to that memory, thus disabling photographing or data reception.

If, for example, a communication call occurs immediately before one photographs something and the reception data occupies the memory into which the photographed image is to be stored, the previously possible photographing is no longer possible.

To avoid such a problem, the user needs to decide whether communication is permitted or not each time he receives a call; this, however, prevents immediate use for photographing, as well as shutter chances (photo opportunities). Such a problem provides a large drawback for digital cameras.

In addition, if a photographing function is operated during communication, the received data may not be stored in the memory to the last moment. This also affects the certainty of communication, providing a large drawback for the communication function.

The present inventor previously has disclosed a countermeasure against the above-mentioned problems in which a sum, A, of an amount of reception-expected data and a typical data size of images obtained in the current photographing mode is compared to the remaining amount of memory capacity and, if A is larger than the remaining amount, the compressibility of the image data is increased (U.S. application Ser. No. 09/162,720 filed on Sept. 30, 1998). This technology, however, may degrade the quality of photographed images and make it impossible to photograph a sufficient number of images. Also, if received data alone exceeds the remaining amount of storage capacity, then that technology needs improvements.

Another disclosure teaches to store only part of received data in a memory; however, if such data as required as a whole is received, this method also needs improvements.

SUMMARY OF THE INVENTION

An object of the present invention is to solve all or at least one of the above-mentioned problems.

Another object of the present invention is to prevent the apparatus functions from being limited with the decreasing remaining (unrecorded) amount of the storage capacity.

Still another object of the present invention is not to degrade the immediate availability of the data generation function.

Still another object of the present invention is to prevent generated data from not being recorded with the decreasing remaining amount of the storage capacity because of received data.

In view of these objects, one preferred embodiment of the present invention discloses a method which comprises the steps of:

receiving data;

generating data;

and controlling the recording of first data received at the above-mentioned reception step and second data generated at the above-mentioned generation step, into a storage medium;

wherein, the above-mentioned controlling step controls the recording of the above-mentioned first data into the above-mentioned storage medium so that the above-mentioned second data may be stored in a remaining (unrecorded) region of the above-mentioned storage medium when the above-mentioned first data is received.

Still another object of the present invention is to reliably receive data which has been sent without unreasonably decreasing the amount of the received data or the data to be generated, even if the existing storage capacity is not sufficient to store all of the received data.

In view of such objects, another preferred embodiment of the present invention discloses a method for information processing, wherein the above-mentioned controlling step comprises a sending step of sending to a sending apparatus a direction (instruction) that the above-mentioned first data should be transferred to another apparatus if the difference between the remaining amount of storage capacity of the above-mentioned storage medium and the amount of the above-mentioned first data is less than a predetermined value.

Also, another information processing method is disclosed, wherein the above-mentioned controlling step comprises a sending step of sending data corresponding at least to the amount of the above-mentioned first data of the data stored in the storage medium if the difference between the remaining amount of the storage capacity of the above-mentioned storage medium and the amount of the above-mentioned first data is less than a predetermined value.

Still another object of the present invention is to improve the function of the imaging (image pickup) step which requires immediate availability.

In view of such objects, another preferred embodiment of the present invention discloses an information processing method, wherein the above-mentioned generation step comprises an imaging step, thereby generating image data imaged (picked up) by the above-mentioned imaging step as the above-mentioned second data.

Still another object of the present invention is to provide a user-desired image quality of the images obtained by the imaging step.

In view of such objects, still another preferred embodiment of the present invention is to disclose an information processing method, wherein the above-mentioned imaging step has a plurality of modes each relating to the data size of photographed images, and the above-mentioned predetermined value is determined to be larger than at least the data amount of an image according to the above-mentioned modes.

Still another object of the present invention is to provide such a storage medium that stores the programs for realizing by use of computers an information processing apparatus provided with functions to realize the above-mentioned methods, an imaging apparatus, a communication apparatus, or the above-mentioned methods.

Other objects and features of the present invention will be apparent from the following description of the embodiments with reference to the appended drawings.

BRIEF DESCRIPTION OF THE DRAWINGS

FIG. 4 shows various functions of the above-mentioned digital camera;

FIG. 7 is a flowchart illustrating programs for performing photographing by the above-mentioned digital camera;

FIG. 9 is a flowchart illustrating programs for performing a play-back function in the above-mentioned interrupt processing;

DETAILED DESCRIPTION OF THE PREFERRED EMBODIMENTS

First embodiment

Figure 1:
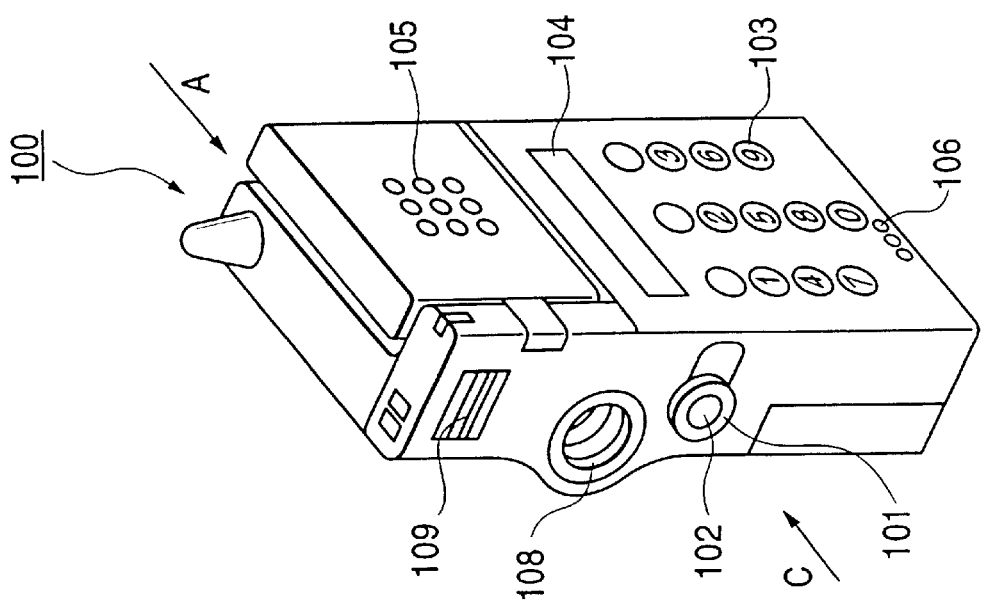
FIG. 1 is an external view of a digital camera according to a first embodiment.

An image processing method related to the present invention is carried out by a digital camera 100 such as shown for example in FIG. 1.

The digital camera 100 utilizes an image processing apparatus or an image entry apparatus related to the present invention.

That is, the digital camera 100 in this embodiment has such communication functions as a telephone or an E-mail, being provided, as shown in FIG. 1 (external view of the apparatus), with a shutter button 102, a mode dial 101, a lens 103, and a strobe 109 arranged above the lens 108 on the front surface of the body.

On the side of the body of the digital camera 100 are provided a built-in speaker 105, a black/white LCD 104, a keyboard 103, a later-mentioned jog dial (not shown), and a built-in microphone 106.

Figure 2:
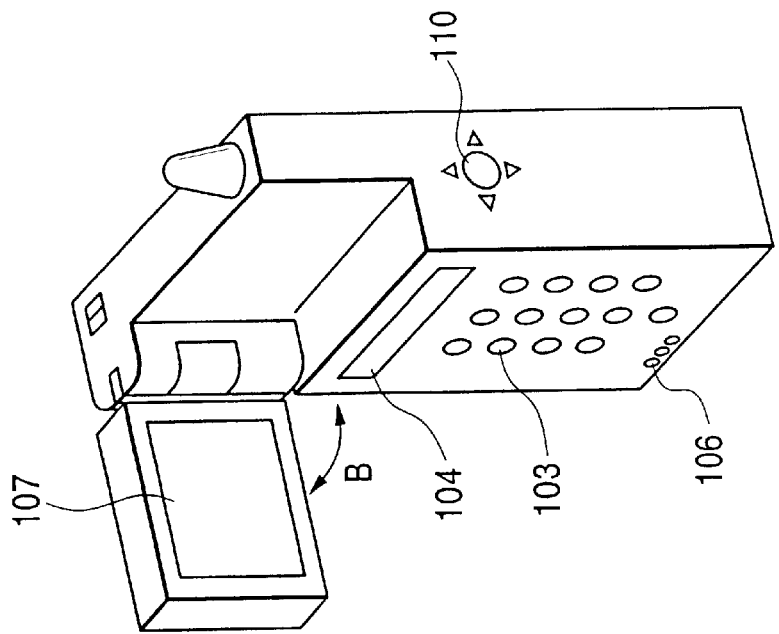
FIG. 2 is another external view of the above-mentioned digital camera as viewed in another direction.

Also, a pointing device 110 is provided, as shown in FIG. 2 (external view of the apparatus as viewed from an arrow A direction in FIG. 1 above), on a surface opposing the surface on which are provided the shutter button 102, the mode dial 101, the lens 108, and the strobe 109.

Further, the above-mentioned speaker 105 is, as shown in the figure, provided on the body of the digital camera 100 in such a way that it can be opened and closed in the arrow B direction and that when it is opened, the LCD 107 can be observed.

Figure 3:
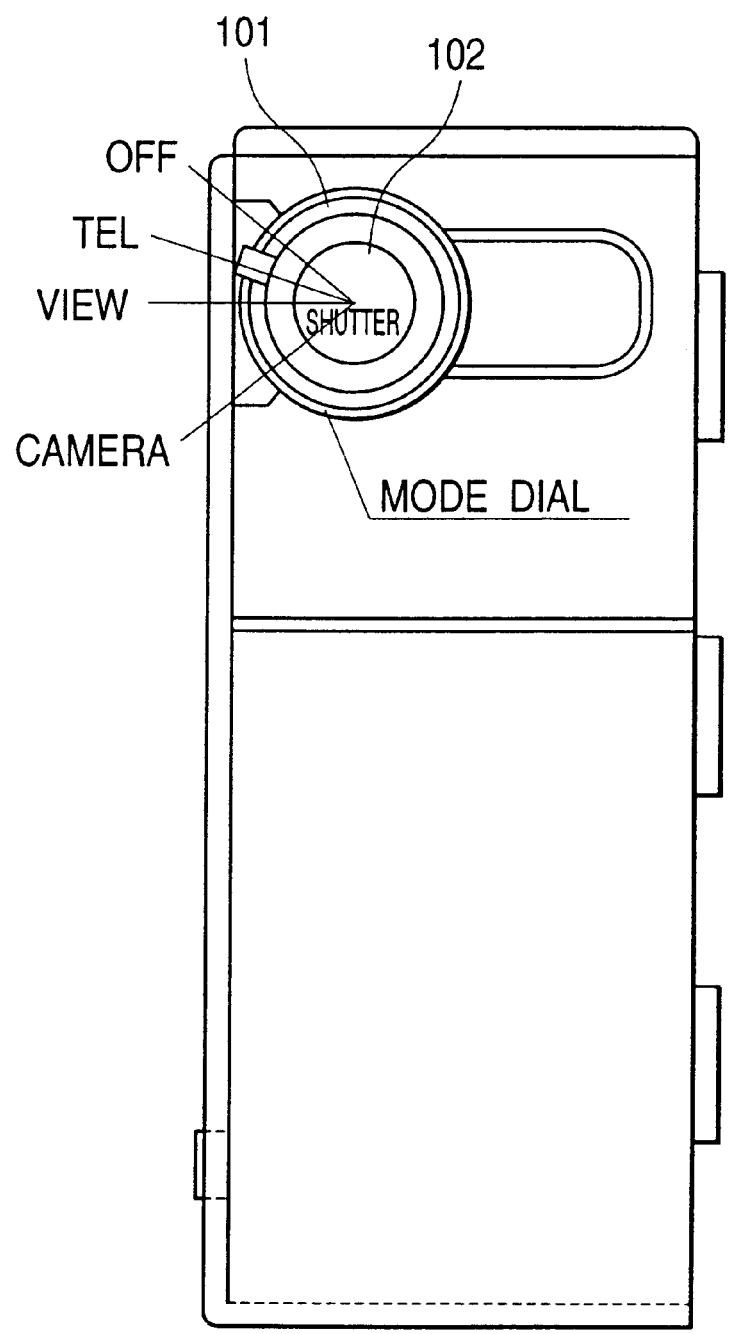
FIG. 3 illustrates the mode dials of the above-mentioned digital camera.

Note here that the above-mentioned mode dial 101 has a power-switch function, so that as shown in FIG. 3 (front view of the mode dial 101 as shown from an arrow C direction in FIG. 1 above), it may turn about the shutter button 102.

With this mode dial 101 being turned, the mode can be switched among the power-off state (OFF mode), the telephone-enabled state (TEL mode), the state that displays the information such as images, voice, texts, etc. stored in the digital camera 100 (VIEW mode), and the state where the camera can be used for photographing (CAMERA mode).

With this, the functions in the above-mentioned various modes of the digital camera 100 can be shown in FIG. 4.

As shown in FIG. 4, all the modes except the OFF mode are capable of receiving telephone calls (TEL call receiving function).

In the TEL mode, one can operate usual personal handyphone system (PHS) telephones (TEL call receiving function and TEL call transmission function). That is, in the TEL mode, one can enter telephone numbers from the keyboard 103 of the digital camera 100 body and display the numbers entered in the black/white LCD 104 and the telephone numbers stored beforehand (display of the telephone book), so that he can use the telephone for transmission and reception of calls by using the built-in speaker 105 and microphone 106.

In the TEL mode also, as occasion demands, one can use a color LCD 107, to use various colors in order to select complex optional functions easily.

Note here that the "transmission and reception of telephone calls" as referred to here intends to include data communication enabled by PHS telephones, cellular telephones, etc.

In the VIEW mode, one can select the images photographed in the later-described CAMERA mode, the recorded voice, the received images or voice, or the texts, to reproduce or display them (image display/output function, audio output function, text display function, E-mail function).

In the CAMERA mode, the details of which are described later, the image of a subject with an intervention of the lens 108 is photo-electrically transferred by a charge coupled device (CCD) or other imaging element into electric signals, which then undergo predetermined image processing and are stored in a flash memory or other memory device (image entry/storage functions).

In the CAMERA mode also, the pointing device is used to select the light-emitting conditions of the strobe 109 from the menu screen displayed on the color LCD 107 and, under such conditions, illuminate the subject.

Further, in the CAMERA mode, the later-described playback function enables one to check photographed images, erase them if they are unnecessary, record them as annotation (audio entry/storage function), or send them as E-mails to desired destinations (E-mail transmission function).

The above-mentioned digital camera 100 has such an internal configuration that, as shown in FIG. 5 for example, mainly has a main-CPU unit 201, a sub-CPU unit 202, a PHS unit 203, and a camera unit 204, which cooperate in performing various functions in the above-mentioned TEL mode, the VIEW mode, and the CAMERA mode.

The following will describe the operations of the main-CPU unit 201, the sub-CPU unit 202, and the camera unit 204 specifically. Camera unit 204

Figure 5B:
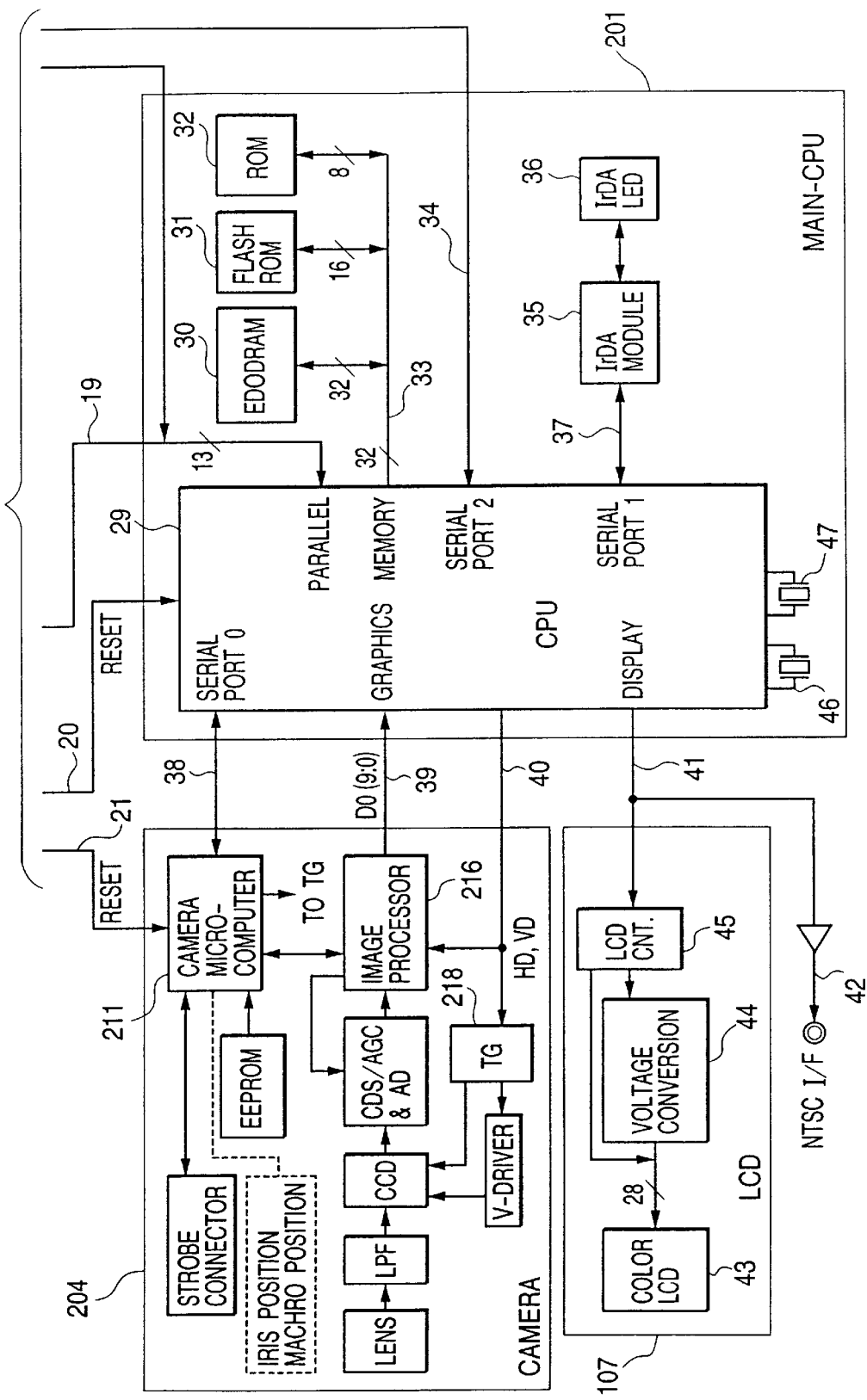
FIG. 5 is comprised of FIGS. 5A and 5B showing a block diagram of an internal configuration of the above-mentioned digital camera.
Figure 6:
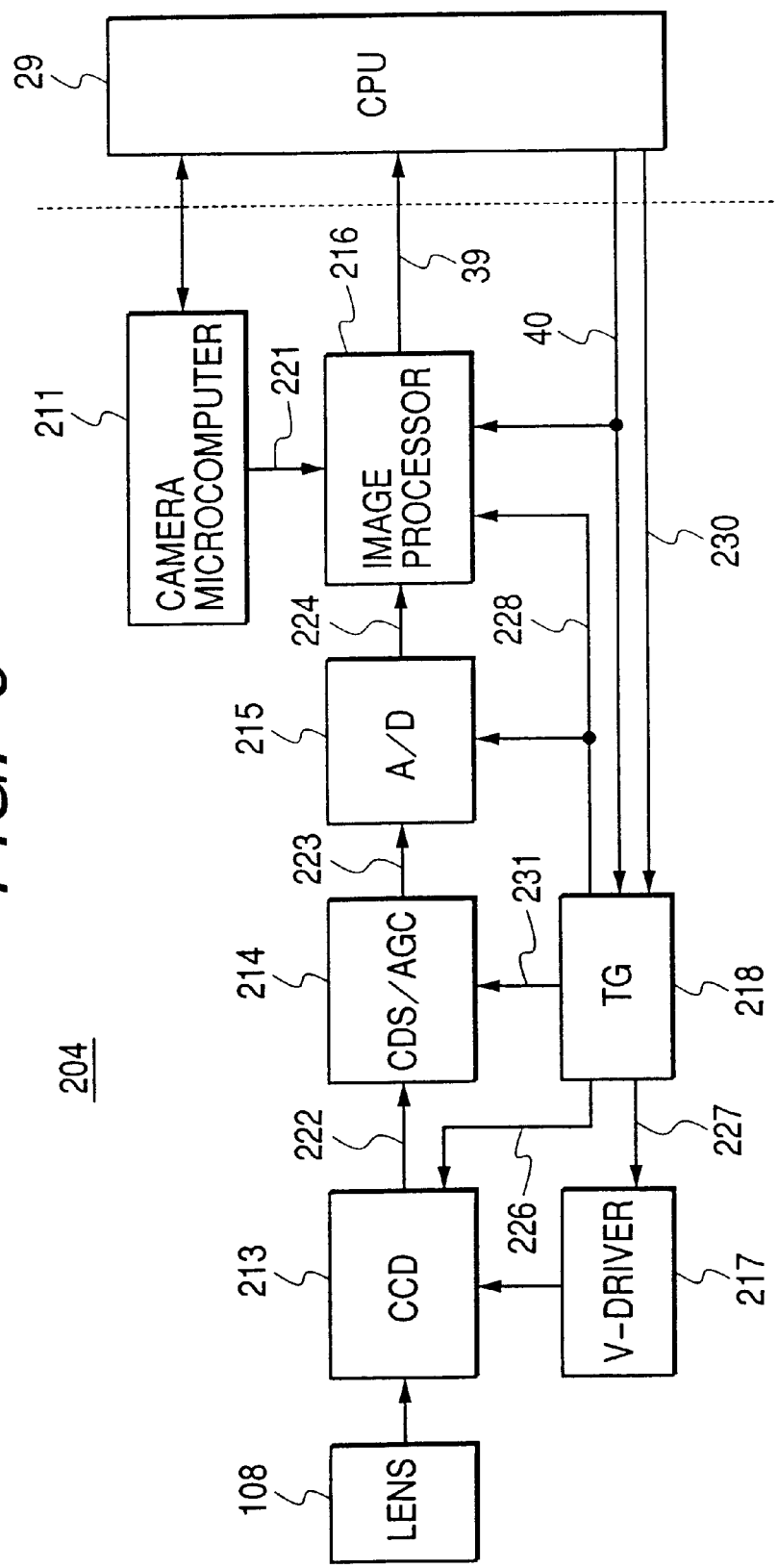
FIG. 6 is a block diagram of a detailed configuration of a camera unit of the above-mentioned digital camera.

FIG. 6 specifically shows the camera unit 204 of FIG. 5 above.

As shown in FIG. 6, the camera unit 204 comprises: an imaging element 213 provided so that incident light from the lens of FIG. 1 above may form an image on the imaging surface; a CDS/AGC circuit 214 to which an output from the imaging element 213 is supplied; an A/D converter 215 to which an output from the CDS/AGC circuit 214 is supplied; a signal processing circuit 216 to which an output from the A/D converter is supplied; and a camera microcomputer 211 connected with a CPU 29 (FIG. 5) of the main-CPU 210, the details of which are described later, so that an output from the camera microcomputer 211 is supplied to the signal processing circuit 216 and an output from the signal processing circuit 216 is supplied to the CPU 29.

The camera unit 204 comprises a timing generator 218 to which an output from the CPU 29 is supplied and a vertical driver 217 to which an output from the timing generator 218 is supplied, so that an output from the timing generator is supplied to the imaging element 213, the CDS/AGC circuit 214, the A/D converter 215, and the signal processing circuit 216, and an output from the vertical driver is supplied to the imaging element 213.

Also, to the above-mentioned signal processing circuit 216 is supplied an output from the CPU 29.

In the camera unit 204 such as mentioned above, the camera microcomputer 211 communicates with the CPU 29 which controls the entire apparatus, thus conducting control over the entire camera unit 204. For example, the camera microcomputer 211 is provided with information on the position of the lens 108 (see FIG. 1 above), thereby controlling the operations thereof for various kinds of image processing, and sends to the CPU 29 information to prompt the user to perform operations based on the conditions of the diaphragm.

Specifically, the lens 108 is for example a zoom lens with a magnification of ×3 and configured so as to be capable of moving the zoom position manually, having a focal distance of 34–103 mm in terms of 35-mm camera. The lens position is output by a Hall element (not shown) to the camera microcomputer 211. The camera microcomputer 211, therefore, controls the operations of the camera unit 204 so that various kinds of image processing may be performed according to thus obtained lens position of the lens 108.

The brightness, on the other hand, comes in for example F2.4 through F3.5. Between the lens 108 and the imaging element 214 are provided two types of optical diaphragms (not shown) for opening and closing the aperture, which are operated by hand. With this, the camera microcomputer 211 detects the aperture-closing position and sends the results to the CPU 29. The CPU 29, therefore, notifies the user of such warning as shortage or excess of the light amount based on these detected results.

The strobe 109 is provided with a dimmer circuit and controlled in terms of charging and light emission also by the camera microcomputer 211. That is, the strobe 109 changes the dimming control reference level based on the lens position of the lens 108 (zoom lens) supplied from the camera microcomputer 211, thus obtaining appropriate light emission irrespective of the lens position of the lens 108.

Note here that the CPU 29, the details of which are described later, comprises hybrid IC's having a memory controller and a serial interface, to control the apparatus as a whole.

The above-mentioned control by the camera microcomputer 211 permits the camera unit 204 to behave as follows.

First, a timing generator (TG) 218 is provided with a clock K signal 230 which provides a basis for the timing of the apparatus as a whole and a horizontal/vertical synchronization signal 40 generated by the CPU 29 at display timing at the imaging element 108.

The timing generator, which generates timing signals to the imaging element 213 so that it may form images, synchronizes with the clock K signal 230 and the horizontal/vertical synchronization signal 40 to supply a timing signal 226 (timing signal which provides a basis for forming images) to the imaging element 213, a timing signal 227 (timing signal given to the imaging element 213 for voltage conversion), a sample-hold signal 231 (timing signal for holding sampling) to the CDS/AGC circuit 214, and a sample-clock signal 228 (clock signal which provides a basis for sampling picture element signals) to the A/D converter 215 and the signal processing circuit 216.

At the same time, the lens 108 refracts a light from a subject (not shown) to collect it onto the imaging surface (charged surface) of the imaging element 213.

The imaging element 213 comprises for example CCD's and forms images having dimensions of for example horizontal 1280 picture elements (dots)×vertical 960 picture elements. The imaging element 213 converts the above-mentioned subject light from the lens 108 into an electric signal (charge) according to the timing signal from the timing generator 218 and supplies it as an analog signal to the CDS/AGC circuit 214.

The vertical driver (V-driver) 217 converts the voltage amplitude of signals which drive the imaging element 213 according to the timing signal 227 from the timing generator 218.

With this, the CDS/AGC circuit 214 is provided with an electric signal comprising horizontal 1280 dots and vertical 960 dots as a photographed-image signal.

The CDS/AGC circuit 214 samples the photographed-image signal 222 obtained from the imaging element 108 according to the sample-hold signal 231 from the timing generator 218, to automatically control its signal amplitude. The CDS/AGC circuit 214 then supplies the photographed-image signal obtained as a result of the processing to the A/D converter 215.

The A/D converter 215, according to the sample-clock signal 228 from the timing generator 218, converts a photographed-image signal (analog picture-element signal) from the CDS/AGC circuit 215 into 10-bit digital data 64 and supplies the digital data 224 to the signal processing circuit 216 through a 10-bit data bus.

The signal processing circuit (Image Processor) 216, which is an image processing IC, receives a control signal 221 from the CPU 29 via the camera microcomputer 211. The signal processing circuit 216, therefore, uses the control signal 221 to perform read/write operations to an internal register (not shown), thus carrying out such image processing as white balancing, AE, etc.

Specifically, the signal processing circuit 216, according to the sample clock signal 228 from the timing generator 218, performs correction such as white balancing on the digital data from the A/D converter 215 and converts the resultant data into a RGB-based color space from the color space at the imaging element 213 as YUV 8-bit format image data 39 and then supplies it to the CPU 29 via an 8-bit data bus.

Sub-CPU unit 202

The sub-CPU unit 202, as shown in FIG. 5 above, comprises a sub-CPU1 with which it communicates with the main-CPU 201, the PHS unit 203, and the above-mentioned camera unit 204. To this sub-CPU1 are connected a black/white LCD (LCD display) 104, a jog dial 11, a keyboard 103, a mode dial 101, a shutter button 102, an RTC 4, a DC-DC converter 24, and a battery 22.

The sub-CPU unit 202 as mentioned above has the following functions.

(2-1)

The sub-CPU1 communicates with the CPU 29 of the main-CPU unit 201, to send and receive commands and data.

This communication is specifically carried out in parallel transfer by means of a bus 19 comprising 13 signal wires.

The bus 19 comprises an 8-bit data bus, a one-bit address signal wire, an I/O READ signal wire, an I/O WRITE signal wire, a Chip Select signal wire, and an INTERRUPT signal wire.

Also, the sub-CPU1 supplies a Reset Request signal Reset for the main-CPU unit 201 to the CPU 29 via a signal wire 21.

Further, the sub-CPU1 supplies a Reset Request signal Reset for control over the camera unit 204 to the camera microcomputer 51 via a signal wire 21.

(2-2)

The sub-CPU1 communicates with the PHS unit 203, to send and receive commands and data.

This communication is specifically carried out in serial transfer by means of a signal wire 16 for serial data transfer signals (TxD, RxD), a signal wire 17 for a RING signal, and a signal wire 18 for a Wake Up signal.

Also, the sub-CPU1 supplies a Reset Request signal Reset for the PHS unit 203 to the PHS module 48 via a signal wire 18.

(2-3)

The sub-CPU1 controls the display operation on the black/while LCD 104 by sending in serial transfer the commands, data, etc. to the black/white LCD 104 via a signal wire 3 for the CS signal, the RS signal, the SDA signal, and the SCL signal.

Also, the sub-CPU1 supplies a BL-ON signal to the black/white LCD 104 via the signal wire 3, thus controlling the ON/OFF operations of the back-light element (not shown) of the black/white LCD 104.

(2-4)

The sub-CPU1 is connected with the RTC 4 via an I2C-BUS (Inter IC BUS: proposed by Philips). The RTC 4 is for generating calendar or time information, etc. Also, the RTC 4 operates on an operational clock signal of, for example, 32.768 kHz, which is supplied to the PHS module 48 via a signal wire 49. The RTC 4 such as mentioned above permits the sub-CPU1 to obtain the information of date, time, etc.

Also, the sub-CPU1 receives at its interruption terminal IRQ an alarm signal from the RTC 4 via a signal wire 6. With this, the sub-CPU1 can generate interrupts at a predetermined point in time.

(2-5)

The sub-CPU1 detects the key-in operations by the mode dial 101, the shutter button 102, and the keyboard 103.

Specifically, the suB-CPU1 detects the operational state of the mode dial 101 (mode transfer switch), thereby identifying four modes of the above-mentioned OFF mode (power-off mode), TEL mode (telephone mode), VIEW mode (reproduction mode), and CAMERA mode (camera mode). For this purpose, the sub-CPU1 is connected with the mode dial 101 by means of four signal wires (switch input terminal) 8.

Also, the sub-CPU1 detects the operational state of the shutter button 102 (shutter switch). The shutter button 102 consists of 2-stage switch coming in a half-depression state and full-depression state. The sub-CPU1, therefore, identifies whether the shutter button 102 is in the half-depression or full-depression state. For this purpose, the sub-CPU1 and the shutter button 102 are interconnected with two signal wires (switch input terminal) 10.

Also, the sub-CPU1 detects the operational state of the jog dial 11. The jog dial 11 is used for example to select desired ones of a plurality of items displayed on the screen of the black/white LCD 104. For example, the user can operate the jog dial 11 to move the cursor on the display screen of the black/white LCD 104 and then depress the jog dial 11 when that cursor is positioned on the desired item, thus determining that item. Also, the jog dial 11 can be configured so as to be inclined to right and left, thereby switching the display of the black/white LCD 104. When, for example, the jog dial 11 is inclined to the left, the previous screen is recovered and when it is inclined to the right, the following screen appears. Such behavior involved in the operations of the jog dial 11 is controlled by detecting the operational state of the jog dial 11 by the sub-CPU1. Therefore, the sub-CPU1 and the jog dial 11 are interconnected by means of a total of five signal wires (switch input terminal) 12 including two signal wires for deciding the rotation direction of the jog dial 11, one signal wire for deciding the depression of the jog dial, and two signal wires for deciding its inclination to either left or right.

Also, the sub-CPU1 detects the operational state of the keyboard 103. The keyboard 103, which is used as an alphanumeric keypad for the entry of telephone numbers, comprises switches in an 8×2 key-matrix. The keyboard 103 is, therefore, scanned from the sub-CPU1 by means of eight output signal wires (output terminal) 14 and two input signal wires (input terminal) 15.

The above-mentioned mode dial 101, the shutter button 102, the keyboard 103, and other keys of various types are provided with a special input terminal arranged so as to receive interrupts when an input has changed. For this purpose, when the sub-CPU1 is in a stand-by state because there is no job to execute, it shifts automatically from the stand-by state to a full-on (Full-On) state upon changes in key-in operations, thus performing control necessary to conduct according to changes in entry.

(2-6)

The sub-CPU1 is interconnected with a battery 22 by a signal wire 26, with which it performs serial communication by means of RxD. For example, the sub-CPU1 receives information such as the remaining energy of the battery 22 and the states of the battery as re-charged (voltage, temperature, etc.) and, based on the information, conducts control processing.

Note here that the battery 22 feeds its power to various units of the sub-CPU1 via the DC—DC converter 24. With this, the sub-CPU1 manages power by controlling the ON/OFF switching of the DC—DC converter 24 via a signal wire 25 (output terminal).

The battery 22 is provided with an attachment/detachment detection switch 23 interlocked with a knob (not shown) of the lid of an output port of the battery 22, the detection signal of which attachment/detachment switch 23 is supplied via a communication wire 27 to the sub-CPU1. Based on the detection signal from the attachment/detachment switch 23, the sub-CPU1 knows that the battery 22 is being pulled out and then turns off the power, thus performing processing necessary to prevent the stored data from being destroyed.

Also, the output voltage of the battery 22 is supplied to the sub-CPU1 via a signal wire 28 (input terminal for A/D converter). With this, the sub-CPU1 monitors the voltage of the battery 22 and, if it has detected excessive charging, over-charging, or other abnormality, performs the corresponding protective processing.

Main-CPU Unit 201

As shown in FIG. 5B above, the main-CPU unit 201 comprises the above-mentioned CPU 29, an EDODRAM 30 connected to the CPU 29, a flash ROM 31, an ROM 32, and an IrDA module 35 and an IrDALED 36 connected to the IrDA module 35.

Also, the main-CPU unit 201 comprises crystal oscillators 46 and 47 provided for the CPU 29.

As for the main-CPU unit 201 such as mentioned above, first the CPU 29 (CPU chip) has three serial ports (Serial Ports 0-2).

A signal wire 38 for Serial Port 0 is used for communication with the camera unit 204. The CPU 29, therefore, uses this signal wire 38 to send to the camera unit 204 directions regarding exposure conditions, the strobe 109, the photographing mode, photographing timing, etc.

A signal wire 37 for Serial Port 1 is used for IrDA communication with the external host computer (not shown). The IrDA module 35 here converts serial data given via the signal wire 37 into something for IrDA. It then communicates using infrared ray the IrDA-use data obtained at the IrDA module 35 by an IrDALED 36 (driver/receiver).

A signal wire 34 for Serial Port 2 is used for communication with a radio communication unit (not shown). To the above-mentioned radio communication unit are given commands from the sub-CPU unit 1 of the sub-CPU unit 202 and communication data is given from this CPU 29 via the signal wire 34. Therefore, it is possible to give directions to the above-mentioned communication unit or to collect necessary information without interrupting the transmission during radio communication. For example, it can be used to obtain electric-field intensity information.

Also, the CPU 29 has a parallel interface 19, with which the sub-CPU unit 202 and the main-CPU 201 are interconnected.

Further, the CPU 29 performs image capturing, image signal interpolation and thinning out, outputting of display to the black/white LCD 104 and the color LCD 107, communication with the camera microcomputer of the camera unit 204, the sub-CPU 202, the above-mentioned radio communication unit, and the above-mentioned external host computer, protocol processing usually used in Internet such as TCP/IP, and execution of E-mails and user applications such as WWW.

For this purpose, the CPU 29 is provided with an interface 39 and a display interface of the camera unit 204 as well as not-shown serial ports, memory interfaces, parallel interfaces, general-purpose IO's (hereinafter called GPIO's), an ALU, cache memories, DMA controllers, timers, and compression/extension engines.

The details of the interface 39 of the camera unit 204 and the display interface 41 are described later.

Interrupts can be caused by the camera unit 204's interface and display interface, the timer, the DMA controller, the GPIO, the serial interface, the parallel interface, and the compression/extension engine when each of these changes in its operation.

As DMA channels are allocated the camera unit 204's interface and display interface, the serial interface, and the compression/extension engine, so that data can be transferred once the data is provided, without intervention of the ALU.

The EDODRAM 30 is used as a work area of the OS or the application software. Here it is assumed that the EDODRAM 30 comprises, for example, two 16 M-bit (1M×16) EDODRAM's which operate on 3.3 V.

Note here that the EDODRAM 30 supports the self-refresh mode, thus shifting into a low-power-dissipation state under the control of the memory controller (not shown) of the CPU 29.

The flash ROM 31 is, for example, of an NOR type and connected, as a hardware interface, in the same form as usual SRAM's.

The flash ROM 31 is used to preserve images obtained by photographing at the camera unit 204 and record called E-mails, data obtained through ftp communication, audio data from the microphone connected to the PHS unit 203, and various parameter data.

Data is written into the flash ROM 31 according to the protocol given by the software program executed in the CPU 29.

The ROM 32 consists, for example, of 16 M-bit mask ROMs, to store the OS and the application software programs themselves.

When the CPU 29 is released from the reset state upon power application, the ROM 32 is selected to execute the boot strap code.

The crystal oscillators 46 and 47 are used to generate frequencies used in the CPU 29.

The crystal oscillator 46 generates frequencies used to control the entire system and to perform NTSC coding. The crystal oscillator 47, on the other hand, generates frequencies used to obtain data (data input) from the camera unit 204.

These crystal oscillators 46 and 47 are configured so as to enter the oscillation-stop mode in the low-power-dissipation state.

As mentioned above, the camera unit 204's interface 39 is used to store image data sent from the camera unit 204 into the flash ROM 31.

Note here that the above-mentioned image data is the 4:2:2 format data obtained by performing, at the signal processing circuit 216, color space conversion, image interpolation, auto-white balancing, and auto-focus control and other image processing on the image data (CCDRaw data) obtained by photographing at the imaging element 213. With this, therefore, a sampling frequency which is twice the above-mentioned CCDRaw data is required.

For this purpose, the CPU 29 sends the horizontal synchronization signal HD and the vertical synchronization signal VD to the camera unit 204's signal processing circuit 216 and the timing generator 218 via a signal wire 40. With this, the image data can be stored into the flash ROM 31 at timing synchronized with the operation of the camera unit 204.

The display interface 41 is used to send NTSC signals provided by the CPU 29 to an external connector 42 and an LCD controller 53 of the color LCD 107 (LCD).

The LCD controller 45, therefore, supplies NTSC signals provided from the display interface 41 to the color LCD 43 via a voltage conversion device 44.

The above description has explained about the main-CPU unit 210, the sub-CPU unit 220, and the camera unit 240 which are the main components of the digital camera 100.

Next, the manner in which the digital camera 100 is controlled in operation of photographing, etc., is described specifically.

Control of photographing in CAMERA mode

The ROM 32 beforehand stores, for example, programs according to a flowchart shown in FIG. 7, which programs are read out by the CPU 29 and executed, thus performing the following photographing in the CAMERA mode of the digital camera 100.

First, when power is applied to the digital camera 100 by the mode dial 101 or when the CAMERA mode is entered (step S501), a capacitor for emitting light from the strobe 109 starts to be charged (step S502). This operation is performed for preparation that the strobe can emit light in the CAMERA mode or immediately after the strobe photographing mode is entered.

Next, the camera microcomputer 211 (CCD module containing the controller) which controls the camera unit 204's imaging element 213, etc., is enabled (step S503), and then, the color LCD 107 starts its operation to function as an electronic view finder (EVF) to confirm a subject (not shown) in photographing (step S504).

When photographing is started, the consecutive processing through displaying images fetched from the camera unit 204 onto the color LCD 107 is performed according to the following processing steps.

First, optical information of the subject fetched from the lens 108 is converted by the imaging element 213 into an electric signal (photoelectric conversion) (step S505).

The output signal from the imaging element 213 is interlaced analog signal of thinned-out compact-sized data with 320×240 dots, not the whole data of 640×480 dots.

Next, the signal obtained at step S505 is sent to the signal processing circuit 216, where the signal undergoes the above-mentioned image processing (step S506).

That is, it undergoes such image processing as auto-white balancing, AE, correction at photographing by the strobe 109, and conversion into a YcrCb (4:2:2) format.

Also, the signal (signal converted into the YcrCb format) obtained at step S506 further undergoes by software the correction of errors in the aspect ratio due to differences in the processing frequency and the output image signal for the color LCD 107 (EVF) and Endian conversion (step S507).

Next, the signal which has undergone various types of processing at steps S506 and 507 is converted into an NTSC signal by the NTSC encoder (not shown) (at step S508) and supplied to the LCD controller 45 of the color LCD 107 (step S509).

The color LCD 107, therefore, uses the EVF to display the image of the subject based on the output signal from the LCD controller 45.

Various types of processing at steps S505 through S510 is performed consecutively at a $\frac{1}{30}$ second cycle, thus permitting the color LCD 107 to monitor the subject image always.

With this, when the photographer has depressed a key during the monitoring by the color LCD 107, a resultant detection signal causes an interrupt event, thus making a shift to interrupt processing A.

(1-1) Interrupt Processing A

Figure 8B:
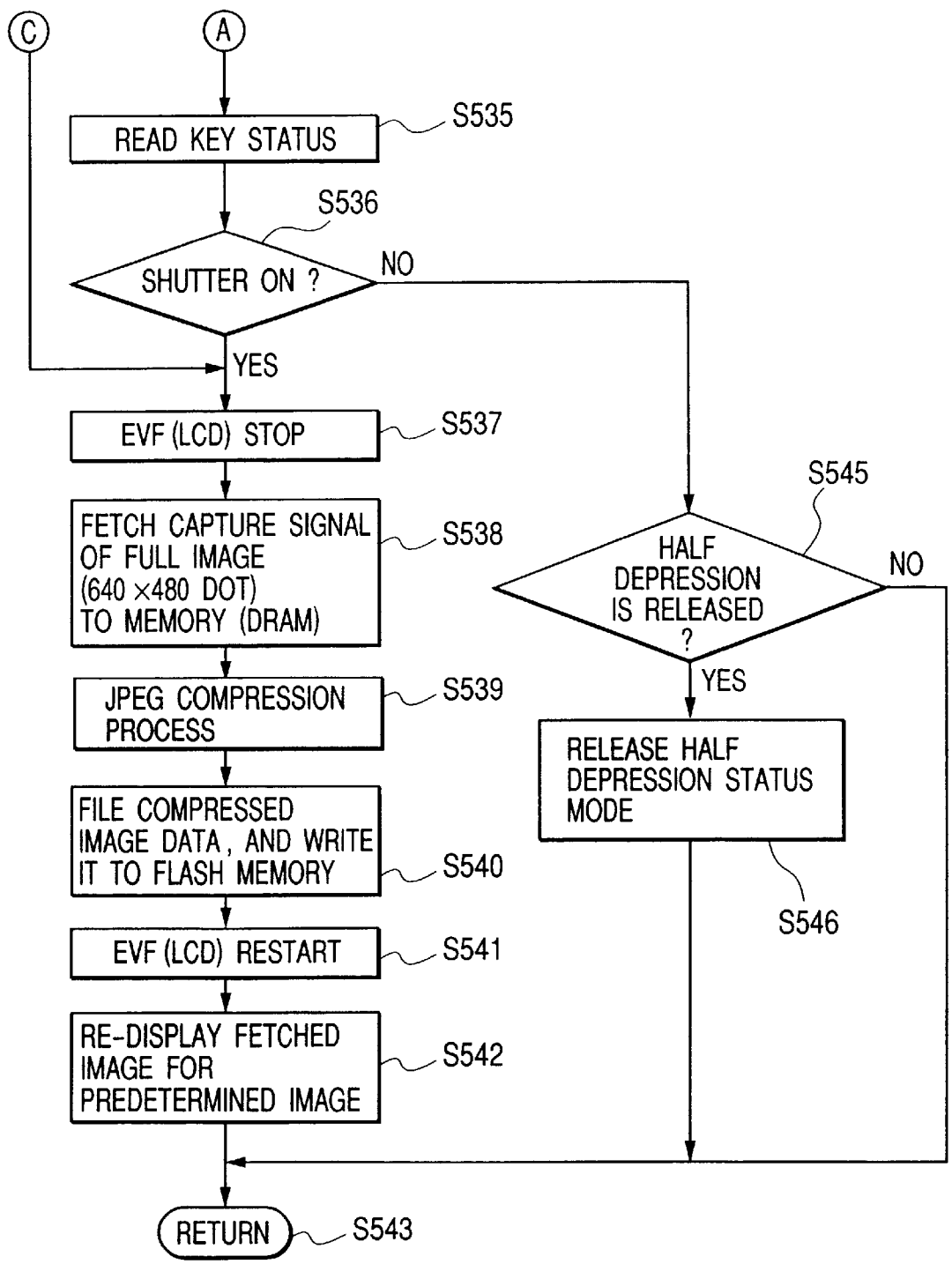
FIG. 8 is comprised of FIGS. 8A and 8B showing a flowchart illustrating programs for performing interrupt processing by key operations in the above-mentioned photographing.

Example, a program corresponding to a flowchart shown in FIGS. 8A and 8B is pre-stored in ROM 32. The following interrupt processing (interrupt processing by key operation) is performed by reading and running the program using CPU 23. At the point in time when this key-in operation has occurred, the system is internally in either of two modes. One is a usual mode, in which as shown in FIG. 7 above, image monitoring is consecutively performed from the time of power application. The other is a half-depression mode, in which the shutter button 102 is once half-depressed with various camera settings being locked, to permit images to be monitored.

Here, the processing start position is described by dividing it into the processing from the usual mode and that from the half-depression mode.

(1-1-1) Interrupt Processing From Usual Mode

First, key status for detecting which key has been depressed is read in (step S521).

When it is decided based on the key status fetched at step S521 that the shutter switch 102 has been operated (step S522), various camera setting in the signal processing circuit 216, such as auto-white balancing, AE, strobe correction in strobe 109 photographing, etc., are locked at the present set-points (step S523) and then, the color LCD 107 (EVF) is stopped in operation to reduce the processing load due to the CPU 29 (step S537).

Next, although the above-mentioned processing of monitoring images involved only compact-sized dot numbers of signals, here as photographed images, a full-image of capture signal of a VGA standard (640×480 dots) is fetched and undergoes predetermined image processing at the signal processing circuit (image processor) 216, to store the YcrCb format data in the EDODRAM 30 (step S538).

The data stored in the EDODRAM 30 at step S538 undergoes image compression processing according to the JPEG standard (step S539), and thus compressed data is written as an image file in the flash ROM 31 (step S540).

Then, the color LCD 107 is shifted from the stop state to the operative state (step S541), to display for a predetermined period of time the image file written in the flash ROM 31 on the color LCD 107 for confirmation of the photographed images (step S542) and then finish this interrupt processing (step S543), in order to return again to the loop processing in FIG. 7 above for re-starting the monitoring of images.

On the other hand, when it is decided based on the key status fetched at step S521 that a key has been depressed for play-back operation (step S524), the later-described play-back function B is performed.

Also, when it is decided based on the key status fetched at step S521 that the shutter button 102 has been half-depressed (step S525), the internal state setting is set to the half-depression mode (step S526) and, in the same way as the above-mentioned step S523, various camera settings in the signal processing circuit 216, such as auto-white balancing, AE, strobe correction in strobe 109 photographing, etc., are locked at the current set-points (step S527).

Then, this interrupt processing is finished (step S528), to return again to the loop processing in FIG. 7 above for re-starting of image monitoring.

When, also, it is decided based on the key status fetched at step S521 that a key has been depressed for changing the photographing conditions (step S529), various camera settings in the signal processing circuit 216, such as auto-white balancing, AE, strobe correction in strobe 109 photographing, etc., are re-set according to the changes in those conditions (step S530), to finish this interrupt processing (step S528) in order to return again to the loop processing in FIG. 7 above for re-starting image monitoring.

When, also, it is decided based on the key status fetched at step S521 that a key has been depressed for turning power off (power-OFF) (step S531), the color LCD 107 is finished in operation (step S532) and then the above-mentioned CCD module is also finished in operation (step S533) consecutively and then other photographing operations are also finished to turn off the system power (step S534).

If, on the other hand, it is not decided at step S531 that a key has been depressed for tuning power off (power-OFF), it is recognized that no valid key has been depressed, to perform no processing in order to finish this interrupt processing (step S528) and return again to the loop processing in FIG. 7 above for re-starting image monitoring.

(1-1-2) Interrupt Processing in Half-Depression Mode

First, key status is read in to detect which key has been operated (step S535).

When it is decided based on the key status fetched at step S521 that the shutter switch 102 has been operated (step S536), the system performs processing starting from the above-mentioned step S537, leaving as validated those various camera settings (step S527) in the signal processing circuit 216 which were locked upon detection of the previous half-depressed key (step S525).

When, on the other hand, it is decided based on the key status fetched at step S521 that the shutter switch 102 has been released from the half-depression state (step S545), the internal state settings are released from those given in the half-depression mode (step S546), to finish this interrupt processing (step S528) in order to return again to the loop processing in FIG. 7 above for re-starting image monitoring. If, also, it is decided based on the key status fetched at step S521 that the shutter switch 102 is not released yet from the half-depression state (step S545), it is recognized that no valid key has been operated, to perform no processing and to finish this interrupt processing (step S543) in order to return again to the loop processing in FIG. 7 above for re-starting image monitoring.

If, also, it is decided based on the key status fetched at step S521 that the shutter switch 102 is not released yet from the half-depression state (step S545), it is recognized that no valid key has been operated, to perform no processing and to finish this interrupt processing (step S543) in order to return again to the loop processing in FIG. 7 above for re-starting image monitoring.

(1-2) Processing of Play-Back Function B

This processing of the play-back function B is executed when it is decided that a key has been operated for a play-back function, at the above-mentioned key-operation decision processing (step S524).

The play-back function here means a function to have actions on photographed images immediately after being photographed by the camera without switching the mode, such as the addition of audio information (audio addition function), etc., the transfer of image information by use of E-mails (mail transfer function), the deletion of images (image deletion function), etc., by simple key operation.

For this purpose, the ROM 32 beforehand stores for example those programs according to the flowchart shown in FIG. 9, which programs are read out by the CPU 29 and executed, thereby performing the play-back function B as described below.

First, it is decided whether there is an immediately photographed image or not (step S551).

The immediately preceding image means a photographed image validated until any other function is performed, such as mode switching immediately after photographing was performed by the operation of the shutter button 102.

When, as a result, it is decided that there is no immediately preceding image, no processing is performed to finish this interrupt processing (step S560) in order to return again to the loop shown in FIG. 7 above for re-starting image monitoring.

When, on the other hand, there is an immediately preceding image, in the same way as the above-mentioned processing at steps S507 through S510 shown in FIG. 7 above, first that immediately preceding image stored in the EDODRAM 30 undergoes by software such processing as correcting errors in the aspect ratio due to differences in the processing frequency (step S552).

Next, the signal processed at step S552 is converted by the NTSC encoder (not shown) into an NTSC signal (step S553) and supplied to the LCD controller 45 of the color LCD 107 (step S554).

On the color LCD 107, therefore, the immediately preceding image of the subject is displayed on the screen by the EVF based on the output signal from the LCD controller (step S555).

Then, the type of a play-back function selected by the photographer is decided (step S556), to branch to each processing.

That is, if the audio addition function is selected, the audio addition processing is performed (step S557); if the mail transfer function is selected, the mail transfer processing is performed (step S558); and if the image deletion function is selected, the deletion processing of photographed images is performed (step S559).

(2) VIEW Mode (Image Display Mode)

The VIEW mode is entered to reproduce (display) images obtained by photographing.

Figure 10:
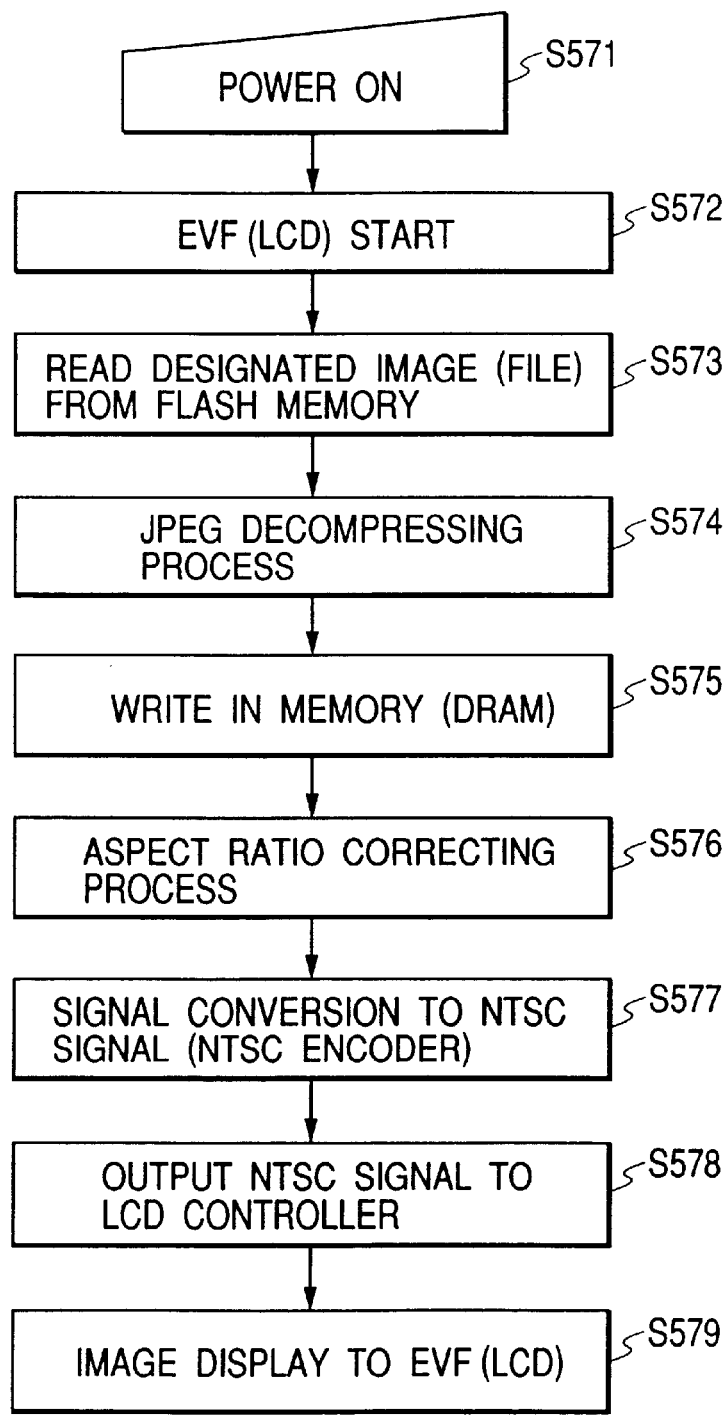
FIG. 10 is a flowchart illustrating programs for performing an image reproduction (display) operation for the above-mentioned digital camera.

For this purpose, the ROM 32 beforehand stores for example those programs according to the flowchart shown in FIG. 10, which programs are read out by the CPU 29 and executed, thereby performing the following operations in the VIEW mode of the digital camera 100.

First, when power is applied to the digital camera 100 by operating the mode dial 101 or the system is switched into the VIEW mode (step S571), the color LCD. 107 starts to operate, behaving as an electronic view finder (EVF) to confirm a subject during photographing (step S572).

Next, by the write-in processing for photographed images shown in FIG. 8 above (step S540), compressed image files are written in the flash ROM 31 (step S573) and the images are decompressed, that is, the compressed data according to the JPEG standard is converted into the original data (YcrCb format data) (step S574).

Then, the original data thus obtained by decompressing at step S574 is written into the EDODRAM 30 (step S575).

Subsequently, in the same way as the processing at steps S507 through S510 shown in FIG. 7 above, the original data (image data) written in the EDODRAM 30 undergoes by software such processing as correcting of errors in the aspect ratio due to differences in the processing frequency (step S576) and is converted into an NTSC signal by the NTSC encoder (not shown) (step S577) and supplied to the LCD controller 45 of the color LCD 107 (step S578).

On the color LCD 107, therefore, selected images designated by the EVF are displayed on the screen based on the output signal from the LCD controller 45 (step S579).

(3) Control of Operations at Time of E-mail transmission and reception

Figure 11:
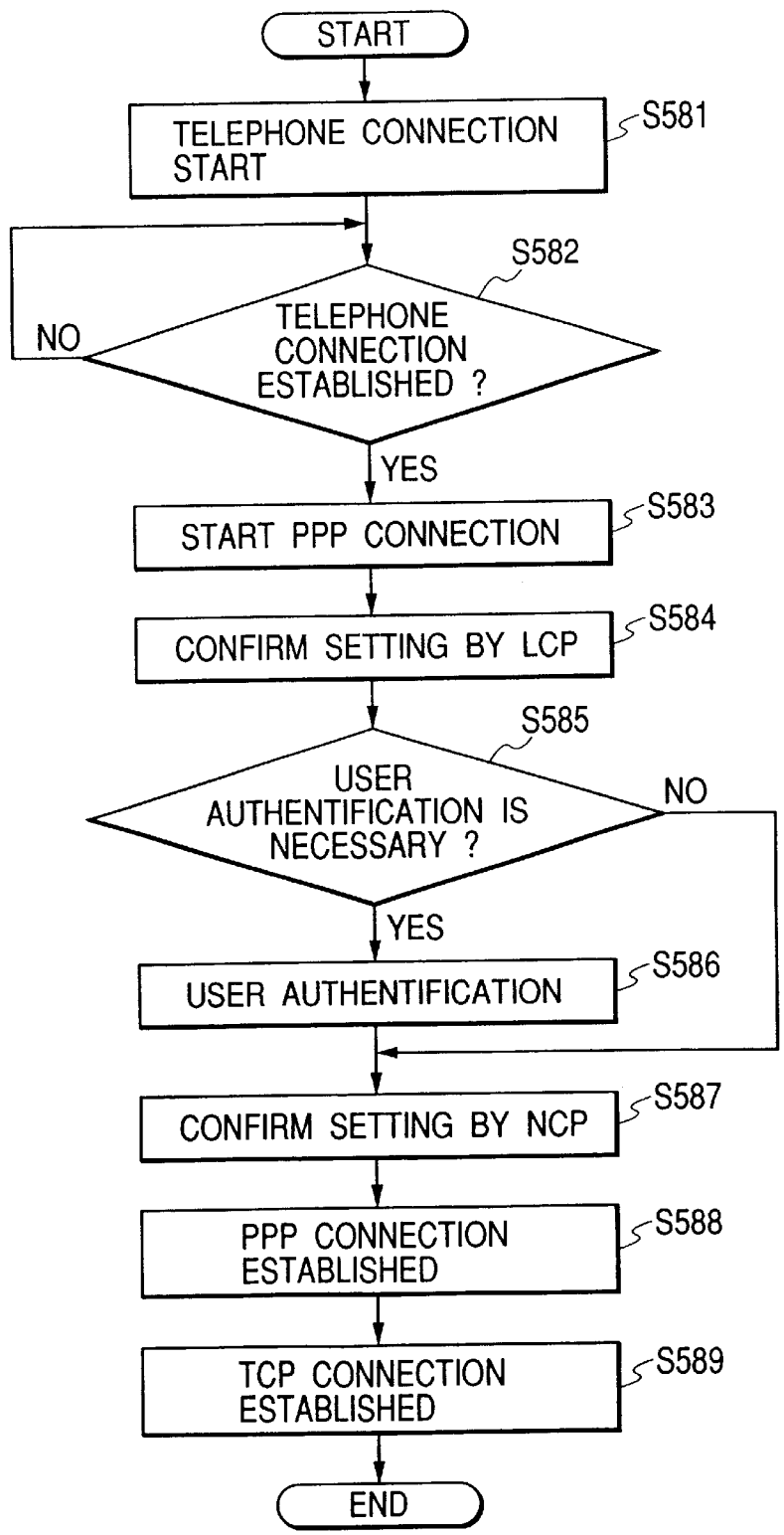
FIG. 11 is a flowchart illustrating programs for performing E-mail link establishing processing for the above-mentioned digital camera.
Figure 12:
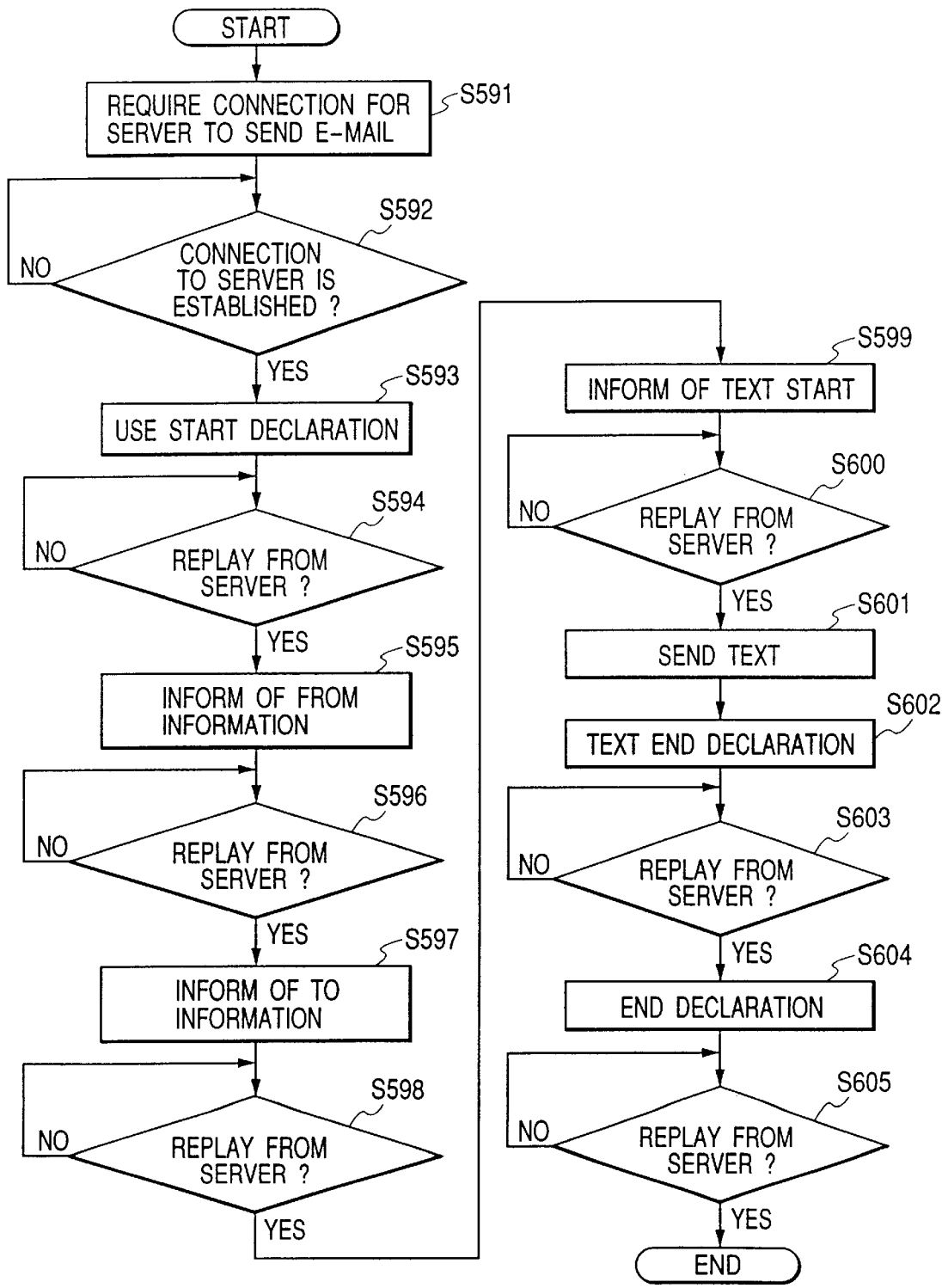
FIG. 12 is a flowchart illustrating programs for performing sending operation for the above-mentioned E-mails.
Figure 13:
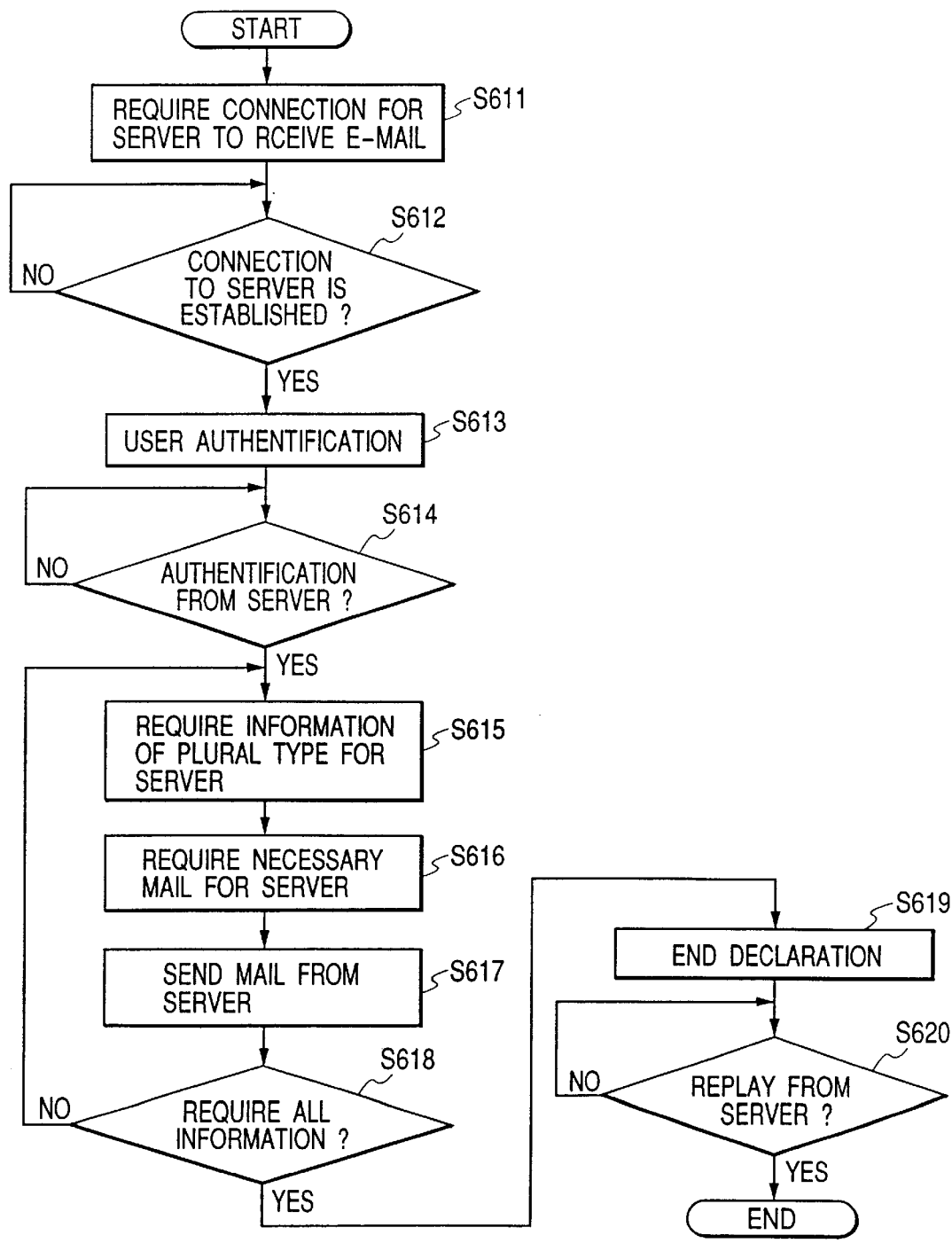
FIG. 13 is a flowchart illustrating programs for performing receiving processing for the above-mentioned E-mails.

The ROM 32 beforehand stores for example those programs according to the flowchart shown in FIGS. 11 through 13, which programs are read out by the CPU 29 and executed, thus performing the following operations required for transmission and reception of E-mails by the digital camera 100.

(3-1) Establishment of Link

For example, a link is to be established for TCP/IP of the point-to-point protocol (PPP) utilizing a telephone line.

That is, as shown in FIG. 11 above, first an AT command is executed to start the connection processing for the telephone line (step S581).

Next, it is decided whether the telephone line connection has been established or not (step S582) and, if it is established, the TCP/IP connection processing is started according to the PPP (step S583).

Next, link is established for data link layers according to the link control protocol (LCP) (step S584).

Next, whether user authentication is required or not is decided (step S585) and, if it is required, the user authentication protocol is performed (step S586).

If user authentication is not required or when user authentication is required and the user authentication protocol is performed, the setting is confirmed according to the network control protocol (NCP) (step S587).

Next, connection is established according to the PPP (step S588), to establish connection according to the LCP (step S589) and finish this processing.

(3-2) E-mail Transmission

When, for example, an E-mail is sent according to the simple mail transfer protocol (SMTP), as shown in FIG. 12 above, first an SMTP client (hereinafter simply called client) issues a connection request to an SMTP server (hereinafter simply called server) for the transmission of the E-mail (step S591).

When a server is connected in response to this connection request, the server returns to the client a response code indicating connection-OK.

The client, when it has recognized the reception of this response code (step S592), uses a Helo command to notify the server of its own domain name, thus declaring the start of using to the server (step S593).

Subsequently, when the server can recognize the domain name of the client, a response code indicating normality, and the domain name of the server are returned to the client.

When the client recognizes that the response code and the domain name of the server are sent (step S594), From information is transmitted to the server by MAIL command, and the user name (address) of a transmission end is designated to declare the start of electronic mail transmission to the server (step S595).

Next, when the server receives From information and the user name of the transmission end from the client, and recognizes that preparations are made for receiving the mail and that there is no error in the user name (address) of the transmission end, the server returns the response code indicating normality to the client.

When the client recognizes that the response code is transmitted (step S596), the addressee of the mail is designated for the server by RCPT command (step S597).

Additionally, when the mail is transmitted to a plurality of persons, a plurality of mail addressees are designated in step S597.

Subsequently, the server judges whether the server can handle the addressee of the mail designated by the client. When the addressee can be handled, the response code indicating normality is returned to the client. Moreover, when it cannot be handled, a code indicating transfer to another SMTP server is returned.

When the client recognizes that the response code indicating normality is transmitted (step S598), it is declared by DATA command that mail text is transmitted to the server (step S599).

Subsequently, when the server receives the declaration of mail text transmission from the client, and is prepared for reception, the response code (response code 354) indicating permission for the mail transmission is returned to the client.

When the client recognizes that the response code is transmitted (step S600), the mail text to be transmitted is transmitted to the server (step S601). Then, the client declares the end of the mail text transmission by transmitting codes such as <CR> <LF>, <CR> <LF> to the server (step S602).

Next, in response to the declaration of the mail text transmission end from the client, the server returns to the client the response code (response code 250) which indicates that request is normally completed.

When the client recognizes that the response code is transmitted (step S603), the transmission end of the electronic mail by SMTP is declared to the server by QUIT command (step S604).

Additionally, in the embodiment, image file (image file obtained by photographing, received image file, and the like) may be attached to the mail text.

Subsequently, in response to the declaration of the end from the client, the server returns the response code indicating the end to the client.

When the client recognizes that the response code is transmitted (step S605), TCP connection is cut, thereby ending the present processing.

(3-3) Electronic Mail Reception

For example, when the reception of electronic mail is performed by POP 3 (Post Office Protocol Version 3), as described above, first, POP client (hereinafter referred to just as the client) issues a request for connection to receive the electronic mail to POP server (hereinafter referred to just as the server) (step S611).

Subsequently, the server returns a response code indicating that connection is OK and a server name to the client (step S611).

When the client recognizes that the response code and server name are transmitted (step S612), by USER and PASS commands, a user name and password for user authentication are returned to the server (step S613).

Subsequently, when the server can confirm the user name and password from the client, the response code indicating normality is returned to the client.

When the client recognizes that the response code is transmitted (step S614), mail box information is requested to the server by STAT command (command indicating a request for mail box reception state information such as the number of mails), or LIST command (command indicating a request for list information of mails present in a mail box) as occasion demands (step S615).

Subsequently, in response to the request the server transmits the mail box information to the client.

The client requires a necessary mail for the server by RETR command based on the information from the server (step S616).

Subsequently, the server transmits the mail required from the client to the client (step S617).

The client receives the mail from the server, and judges whether or not all necessary mails are requested to the server (step S618). When all the mails are not requested, the processing returns to the processing of step S615, and repeats the subsequent processings.

When the client finishes requesting all the necessary mails to the server, the client allows the server by QUIT command to execute an update processing of the mail box, and declares that the reception of the electronic mail by POP 3is ended (step S619).

Subsequently, in response to the end declaration from the client, the server returns the response code indicating the end to the client.

When the client recognizes that the response code is transmitted (step S620), POP 3connection is cut, thereby ending the present processing.

Figure 14:
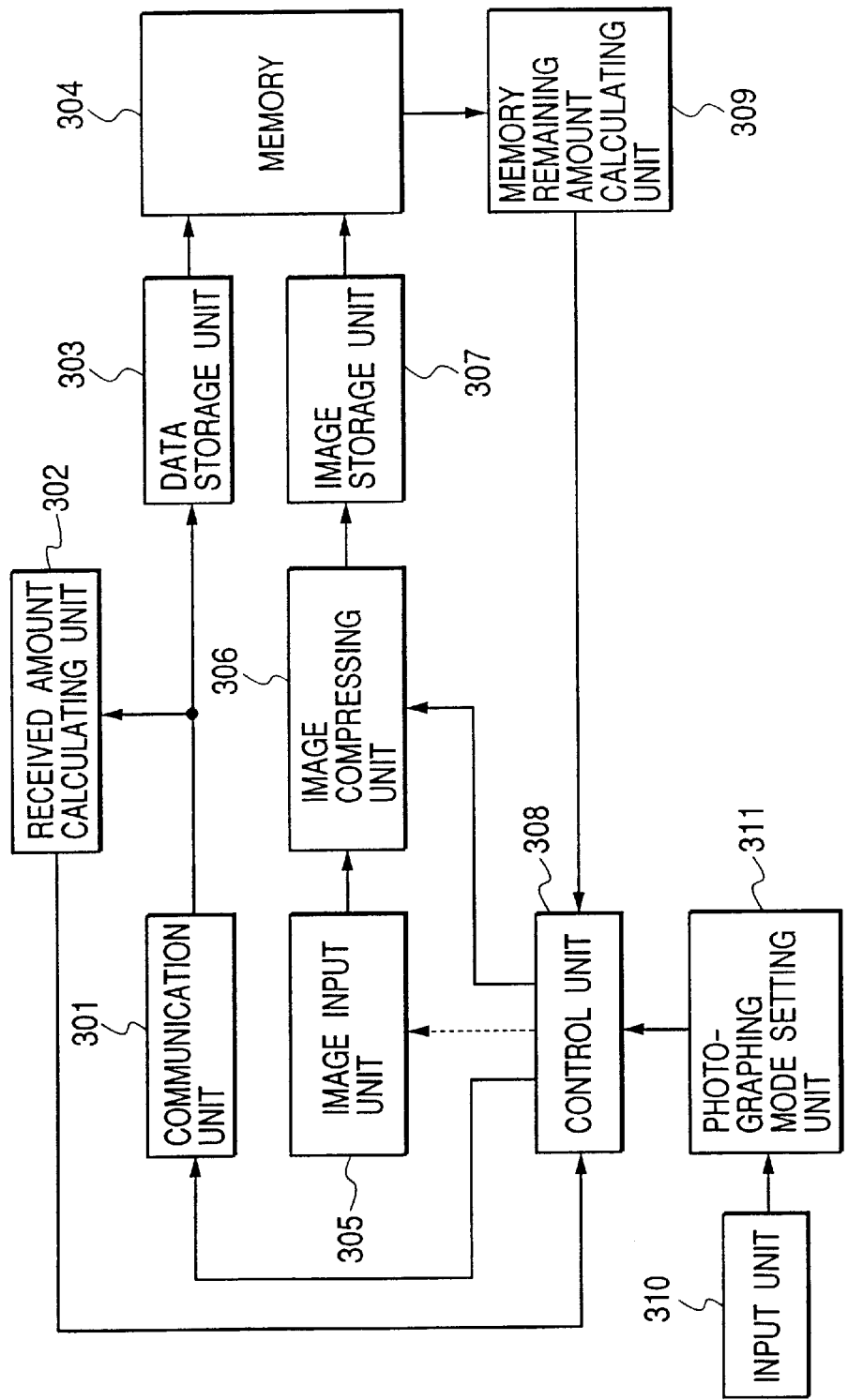
FIG. 14 is a block diagram showing a conceptual control flow of the above-mentioned digital camera.

In the digital camera 100 which has various functions as described above, and is constituted to perform various operations, when the most characteristic control flow is replaced with conceptual blocks, a constitution, for example, as shown in FIG. 14 is obtained.

Specifically, the digital camera 100 is provided with a communication unit 301, a received amount calculating unit 302 and a data storage unit 303 to which outputs of communication unit 301 are supplied, a memory 304 to which an output of data storage unit 303 is supplied, an image input unit 305, an image compressing unit 306 to which an output of image input unit 305 is supplied, and an image storage unit 307 to which an output of image compressing unit 306 is supplied. An output of image storage unit 307 is also supplied to the memory 304.

The digital camera 100 is also provided with a memory remaining amount calculating unit 309 to which an output of memory 304 is supplied; an input unit 310; a photographing mode setting unit 311 to which an output of input unit 310 is supplied; and a control unit 308 to which outputs of the above-described received amount calculating unit 302, memory remaining amount calculating unit 309 and photographing mode setting unit 311 are supplied, and an output of control unit 308 is supplied to the image compressing unit 306 and the communication unit 301.

Here, first the communication unit 301 corresponds to the PHS unit 203.

The received amount calculating unit 302 is realized by the software which is executed in the CPU 29 of the main CPU unit 201. The received amount calculating unit 302 uses communication protocol to calculate the data amount of data estimated to be received by the communication unit 301 (estimated amount of received data).

The data storage unit 303 stores the data received by the communication unit 301 into the memory 304 using a file system.

The memory 304 corresponds to the flash ROM 32 (nonvolatile memory) of the main CPU 201.

The image input unit 305 corresponds to the entire camera unit 204 which has the above-described constitution.

The image compressing unit 306 is incorporated in the CPU 29, and is constituted so that compressed image data size can be adjusted by changing a quantization table.

Table 1 shows examples of photographing modes handled in the present apparatus, image sizes obtained by the photographing modes, and quantization table numbers for use.

TABLE 1

| Photographing Made | Typical Size | Quantization Table |
| --- | --- | --- |
| Economy | 25 KB | 4 |
| Normal | 50 KB | 3 |
| Fine | 100 KB | 2 |
| Super Fine | 200 KB | 1 |

As shown in Table 1, here, the photographing modes are set to Economy mode, Normal mode, Fine mode, and Super Fine mode, the sizes of the image data obtained by the photographing modes are 25 KB, 50 KB, 100 KB, 200 KB, the numbers of the quantization table for use are "4", "3", "2", and "1", and these are classified into four stages.

The image storage unit 307 stores the image data compressed by the image compressing unit 306 into the memory 304 by the CPU 29.

The control unit 308 is realized by the software of the CPU 29, and performs the operation control of the entire apparatus.

Particularly, when it is judged by an indication from the memory remaining amount calculating unit 309 that the remaining amount of the memory 304 is small, control is performed to transmit the data estimated to be received to an external apparatus.

Additionally, in the above-described case, by changing parameters such as the quantization table in the image compressing unit 306, compressing control may be performed. Specifically, when it is judged by the indication from the memory remaining amount calculating unit 309 described later that the remaining amount of the memory 304 is small, this is notified to the image compressing unit 306 to change the compressibility in the image compressing unit 306.

The memory remaining amount calculating unit 309 is realized by the software of the CPU 29, and uses the table of the file system constructed on the memory 304 in calculating the remaining amount of the memory 304.

The input unit 310 corresponds to input switches such as the mode dial 101. Specifically, the unit is used in the case where a photographer indicates the photographing mode and in other cases.

The photographing mode setting unit 311 sets the photographing mode by notifying the state of the mode dial 101 (input unit 310) to the CPU 29 by the sub CPU 1 of the sub CPU unit 202.

A processing by the software for implementing the most characteristic operation in the digital camera 100 as described above will be described hereinafter.

Figure 15:
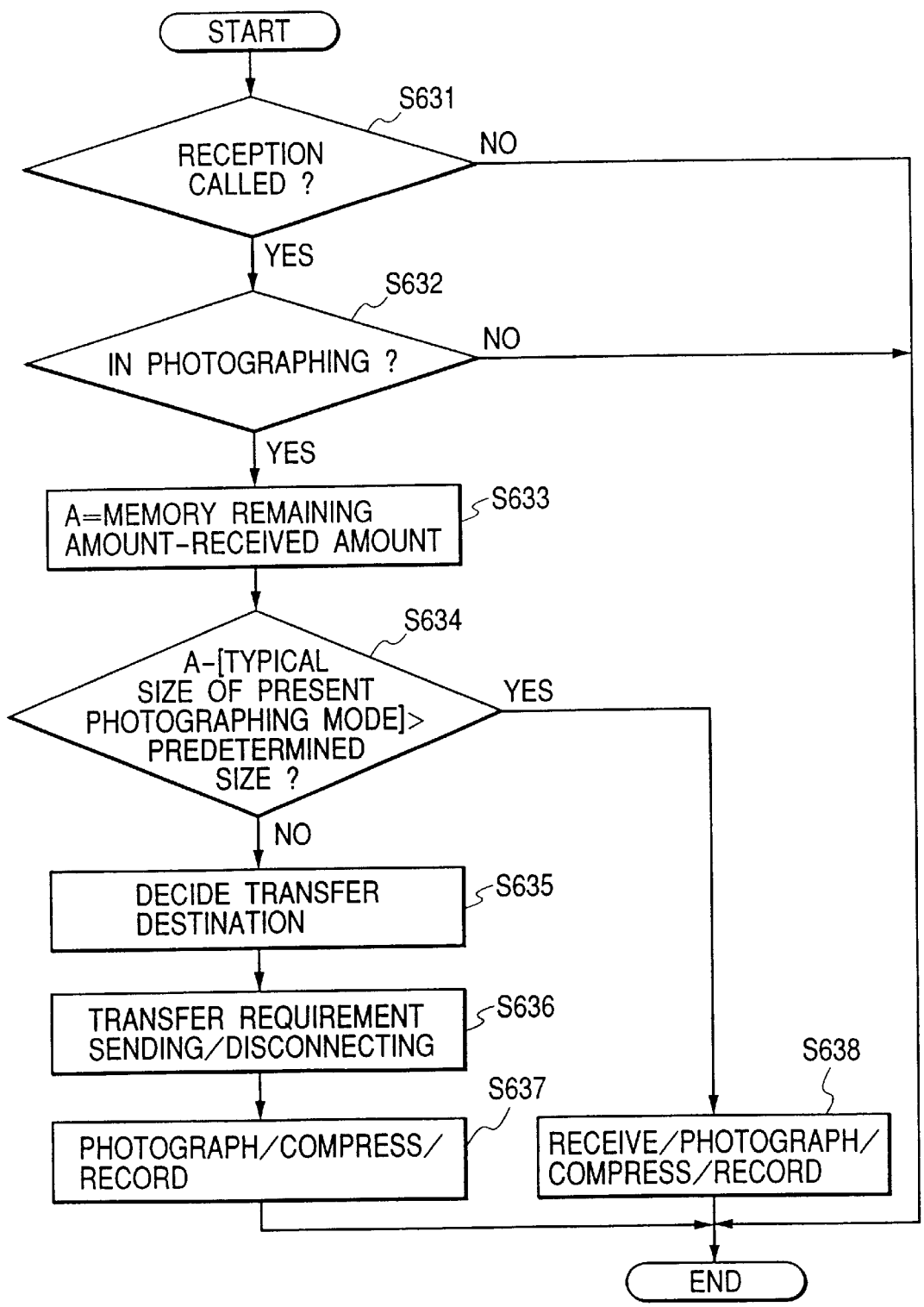
FIG. 15 is a flowchart illustrating programs for performing operation control for the above-mentioned digital camera.

A program according to a flowchart, for example, shown in FIG. 15 is stored beforehand in the ROM 32 of the main CPU unit 201, and the program is read and executed by the CPU 29, so that the digital camera 100 operates as follows.

First, it is judged whether or not the communication unit 301 (PHS unit 203) is in a reception called state (step S631), and it is judged whether or not the image input unit 305 (camera unit 204) is in a photographing state (step S632).

When these judgments result in the reception called state and the photographing state, the processing steps from the next step S633 are executed.

Additionally, when the unit is not in the reception called state in the step S631, the present processing is ended to perform a usual photographing control. In the transmission, since communication timing can be determined under control, photographing timing can be avoided. Moreover, when the photographing state is not judged by the step S632, the present processing is ended to perform the usual photographing control.

Moreover, the judgment of the step S632 concerning whether or not the unit is in the photographing state is performed by detecting whether the shutter button 102 is half or completely depressed. Alternatively, it is detected whether CAMERA mode is set by the mode dial 101.

When the units are in the reception called state and the photographing state, the control unit 308 obtains value A by subtracting the estimated amount of the received data calculated by the received amount calculating unit 302 from the remaining amount of the memory 304 calculated by the memory remaining amount calculating unit 309 (step S633). Here, when the value is sufficiently large, the photographed image can be recorded.

Here, for the estimated amount of the received data, for example, the estimated amount of data obtained by receiving E-mail is calculated. Specifically, the above-described POP 3 is used as the communication protocol, and the LIST and STAT commands of POP 3 are used in the step S615 in the program as shown in FIG. 13 of "requiring the information of plural types for the server" to calculate the amount.

Subsequently, the control unit 308 obtains the typical compressed image size for the present photographing mode set by the photographing mode setting unit 311 from the Table 1, and subtracts the obtained image size from the value A obtained in the step S633. Then, it is judged whether or not the result exceeds the value of predetermined amount (step S634).

The reason why the value of the predetermined amount is used as offset is that it is difficult to predict the compressed image size in the compression of JPEG system or the like and that only the typical size of the compressed image can be predicted. By setting the value of the predetermined amount to be large, it is possible to secure the predetermined amount of sheets of photographed image even after the communication end. However, by recording at least one sheet of image, the problem that the photographed image data cannot be recorded because of the received data can be prevented. When one sheet is considered to be little, the capacity for the number of sheets may be secured. Additionally, since for the predetermined amount the number of sheets able to be photographed changes by the photographing mode, the predetermined amount may be changed in accordance with the photographing mode. In this case, some sheets of image can be photographed with a desired image quality.

As a result of the judgment of the step S634, when the subtracted value exceeds the value of the predetermined amount, this indicates that there is an allowance in the remaining amount of the memory 304. Therefore, the reception processing, photographing processing, compression processing, and recording processing are continuously performed (step S638), thereby ending the present processing.

As the judgment result of the step S634, when the subtracted value does not exceed the value of the predetermined amount, and the usual control is performed, the remaining amount of the memory 304 for photographing cannot be secured, and the receiving operation cannot be performed.

Here, to enhance the reliability of the communication, the data which must have been received (data which were to be stored in the memory 304, hereinafter referred to as "data to be received") is transmitted to another apparatus. For example, in peer to peer communication, it is not seen whether or not communicatable conditions of communication partner constantly agree with those of the present apparatus. Therefore, when bidirectional communication is possible, data is transmitted to a place which can be recognized by the common apparatus.

Therefore, the control unit 308 determines data transmission destination (step S635). For the transmission destination, a predetermined apparatus may be sent, or selection/determination may be performed by a user.

When the data transmission destination is determined, the control unit 308 issues an instruction for data transmission (transfer request) to the transmission destination. When the partner side confirms the request, the calling received in the step S631 is disconnected, and the partner transmits the data to be received to the transmission destination. In this case, the control unit 308 retains the information concerning the data to be received (the amount of memory necessary for reception, transmission destination, file name information, and the like) (step S636).

Thereafter, the photographing processing, compression processing, and recording processing are performed (step S637), thereby ending the present processing.

According to the above-described method, the problem that the generated data cannot be recorded for the received data can be prevented.

Additionally, the calculation is performed as shown in S633, S646, but the value resulting from S633 may be compared with a predetermined value for the calculation. In this case, the predetermined value may be changed in accordance with the photographing mode.

Additionally, after the photographing, the user of the apparatus secures the remaining amount of the memory 304 for receiving the data to be received, and communicates with the transmission destination of the data to be received to receive the data to be received. In this case, when the size of the data to be received, transmission destination, file name and the like held by the step S636 are displayed on the color liquid crystal display 107, the above-described operation can more efficiently be performed.

Second Embodiment

The digital camera in a second embodiment has a constitution similar to that of the digital camera 100 in the first embodiment (see FIG. 14), but is different in the overall control.

Specifically, in this embodiment, the communication operation in the communication unit 301 and the photographing operation in the image input unit 305 are overlapped. Therefore, when a shortage of the remaining amount of the memory 304 occurs, the data to be received is transmitted to another apparatus. Additionally, by receiving a part of the data to be received, the instantaneous property of communication is secured.

Figure 16:
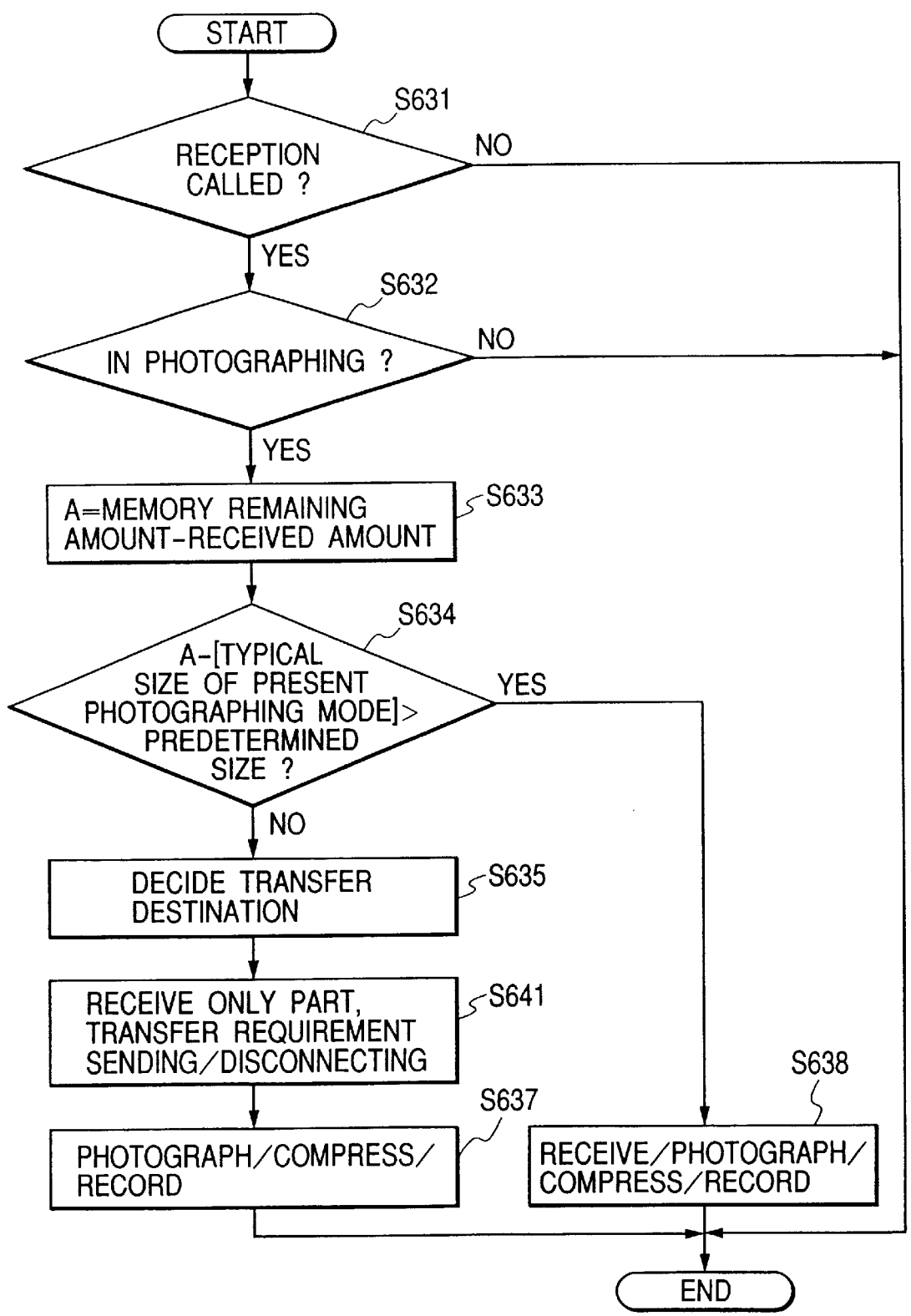
FIG. 16 is a flowchart illustrating programs for performing operation control for the above-mentioned digital camera in a second embodiment.

For this purpose, instead of the program of FIG. 15, a program according to a flowchart, for example, shown in FIG. 16 is used.

Additionally, in the flowchart of FIG. 16, the processing steps similar to those of the flowchart of FIG. 15 are denoted with the same reference numerals, and the detailed description thereof is omitted.

First, it is judged whether or not the communication unit 301 is in the reception called state (step S631), and it is judged whether or not the image input unit 305 is in the photographing state (step S632). When these judgments result in the reception called state and the photographing state, the subsequent processing steps are executed; otherwise the present processing is ended.

When the units are in the reception called state and the photographing state, the control unit 308 obtains the value A by subtracting the estimated amount of the received data from the remaining amount of the memory 304 (step S633), the typical size of the compressed image for the present photographing mode is subtracted from the value A, and it is then judged whether or not the result exceeds the value of the predetermined amount (step S634).

As a result of the judgment of the step S634, when the subtracted value exceeds the value of the predetermined amount, this indicates that there is an allowance in the remaining amount of the memory 304. Therefore, the reception processing, photographing processing, compression processing, and recording processing are continuously performed, thereafter ending the present processing.

On the other hand, as the judgment result of the step S634, when the subtracted value does not exceed the value of the predetermined amount, the control unit 308 determines the transmission destination of the data to be received as described above (step S635).

When the data transmission destination is determined, the control unit 308 controls the communication unit 301 to receive a part of the data to be received.

For example, when the data to be received is document data, only the summary data included in the document data is received. Alternatively, when no summary data exists in the document data, new summary data is mechanically prepared and retained in the control unit 308. Moreover, in the peer to peer communication, the data of a title portion of the data to be received is received. The data partially received in this manner is held inside the control unit 308.

Subsequently, the control unit 308 issues a transmission request (transfer request) to the determined transmission destination, and controls the communication unit 301, so that after the request is confirmed, the calling received in the step S631 is cut, and the data to be received is transmitted to the transmission destination (step S641).

Subsequently, the photographing processing, compression processing, and recording processing are performed (step S637), thereby ending the present processing.

Additionally, after the photographing, the user of the apparatus secures the remaining amount of the memory 304 for receiving the data to be received, utilizes the data partially received by the step S641, and communicates with the transmission destination of the data to be received to receive only the necessary data.

Third Embodiment

The digital camera in a third embodiment has a constitution similar to that of the digital camera 100 in the first embodiment (see FIG. 14), but is different in the overall control.

Specifically, in this embodiment, only when reception from a specific partner is performed in the communication unit 301, the above-described request to the transmission destination is issued.

Figure 17:
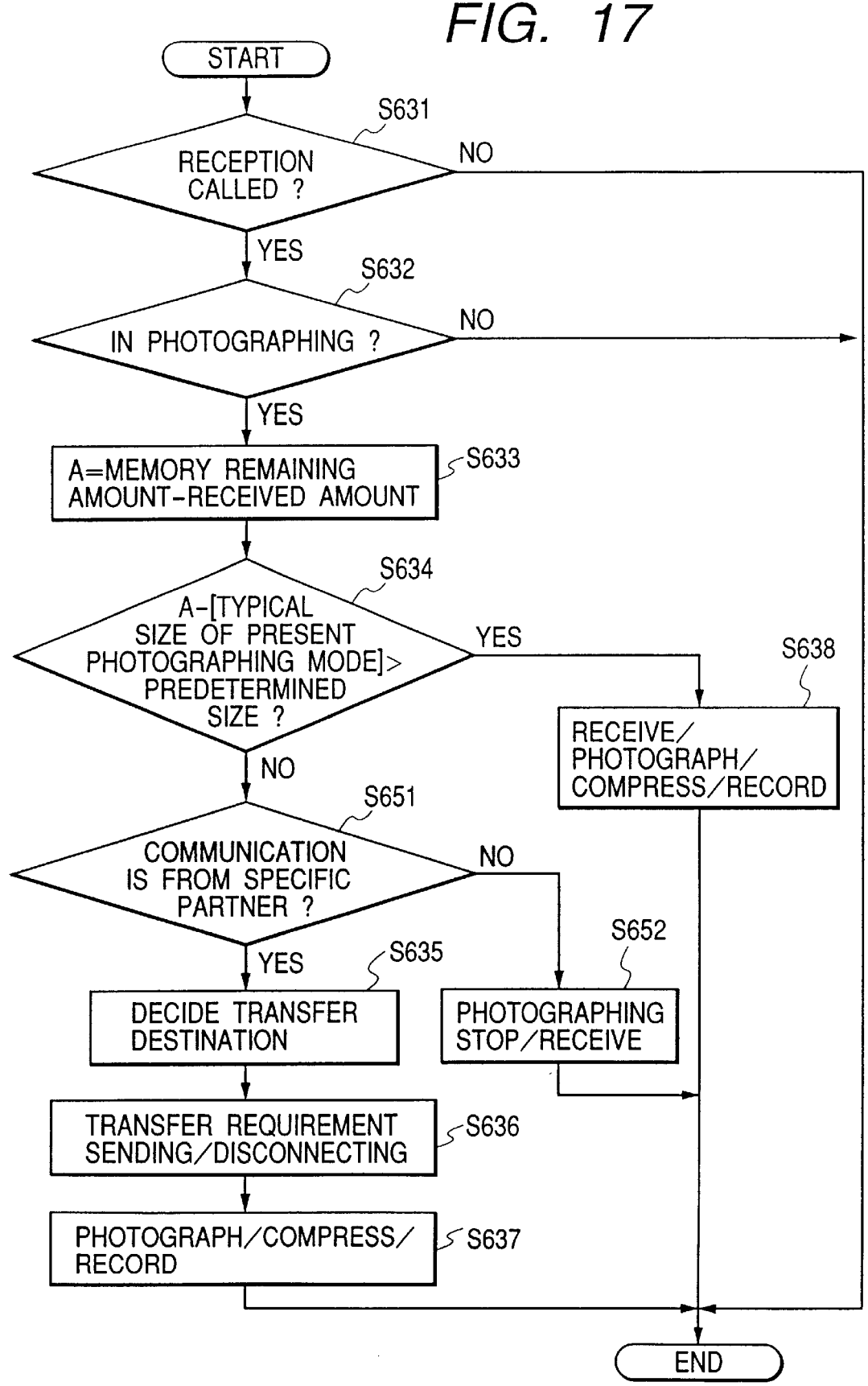
FIG. 17 is a flowchart illustrating programs for performing operation control for the above-mentioned digital camera in a third embodiment.

For this purpose, instead of the program of FIG. 15, a program according to a flowchart, for example, shown in FIG. 17 is used.

Additionally, in the flowchart of FIG. 17, the processing steps similar to those of the flowchart of FIG. 15 are denoted with the same reference numerals, and the detailed description thereof is omitted.

First, it is judged whether or not the communication unit 301 is in the reception called state (step S631), and it is then judged whether or not the image input unit 305 is in the photographing state (step S632). When these judgments result in the reception called state and the photographing state, the subsequent processing steps are executed; otherwise the present processing is ended.

When the units are in the reception called state and the photographing state, the control unit 308 obtains the value A by subtracting the estimated amount of the received data from the remaining amount of the memory 304 (step S633). Thereafter, the typical size of the compressed image for the present photographing mode is subtracted from the value A, and it is judged whether or not the result exceeds the value of the predetermined amount (step S634).

As a result of the judgment of the step S634, when the subtracted value exceeds the value of the predetermined amount, this indicates that there is an allowance in the remaining amount of the memory 304. Therefore, the reception processing, photographing processing, compression processing, and recording processing are continuously performed (step S638), thereby ending the present processing.

On the other hand, as the judgment result of the step S634, when the subtracted value does not exceed the value of the predetermined amount, the control unit 308 judges whether or not the image data is received from the specific partner in the communication unit 301 (step S651). The judgment is realized, for example, by using the transmission number obtained from transmission number service, grasping the transmission number of the partner, and comparing the number with the transmission number preset by the user (number of the specific partner).

As the judgment result of the step S651, when the specific partner is not judged, the control unit 308 controls the image input unit 305 to stop the photographing operation. Thereby, the photographing operation is stopped in the image input unit 305, and the receiving operation in the communication unit 301 is continuously performed (step S652). Thereafter, the present processing is ended.

In the above-described constitution, the priority of photographing and communication can be controlled in accordance with the communication partner, and reception can be performed in preference to the photographing.

Additionally, in the above-described control, for example, instead of stopping the photographing operation, the receiving operation is stopped, and the photographing operation may be continued.

As the judgment result of the step S651, when the specific partner is judged, the control unit 308 determines the transmission destination of the data to be received as described above (step S635), and performs control to transmit the data to be received (step S636). Subsequently, the photographing processing, compression processing, and recording processing are performed (step S637), thereby ending the present processing.

Fourth Embodiment

The digital camera in a fourth embodiment has a constitution similar to that of the digital camera 100 in the first embodiment (see FIG. 14), but is different in the overall control.

Specifically, according to this embodiment, in the communication unit 301, when data including not only image data but also audio data and the like are received, the conflict resulting from the case where two operations, data receiving operation and photographing operation, occur with respect to memory resource is avoided.

Figure 18:
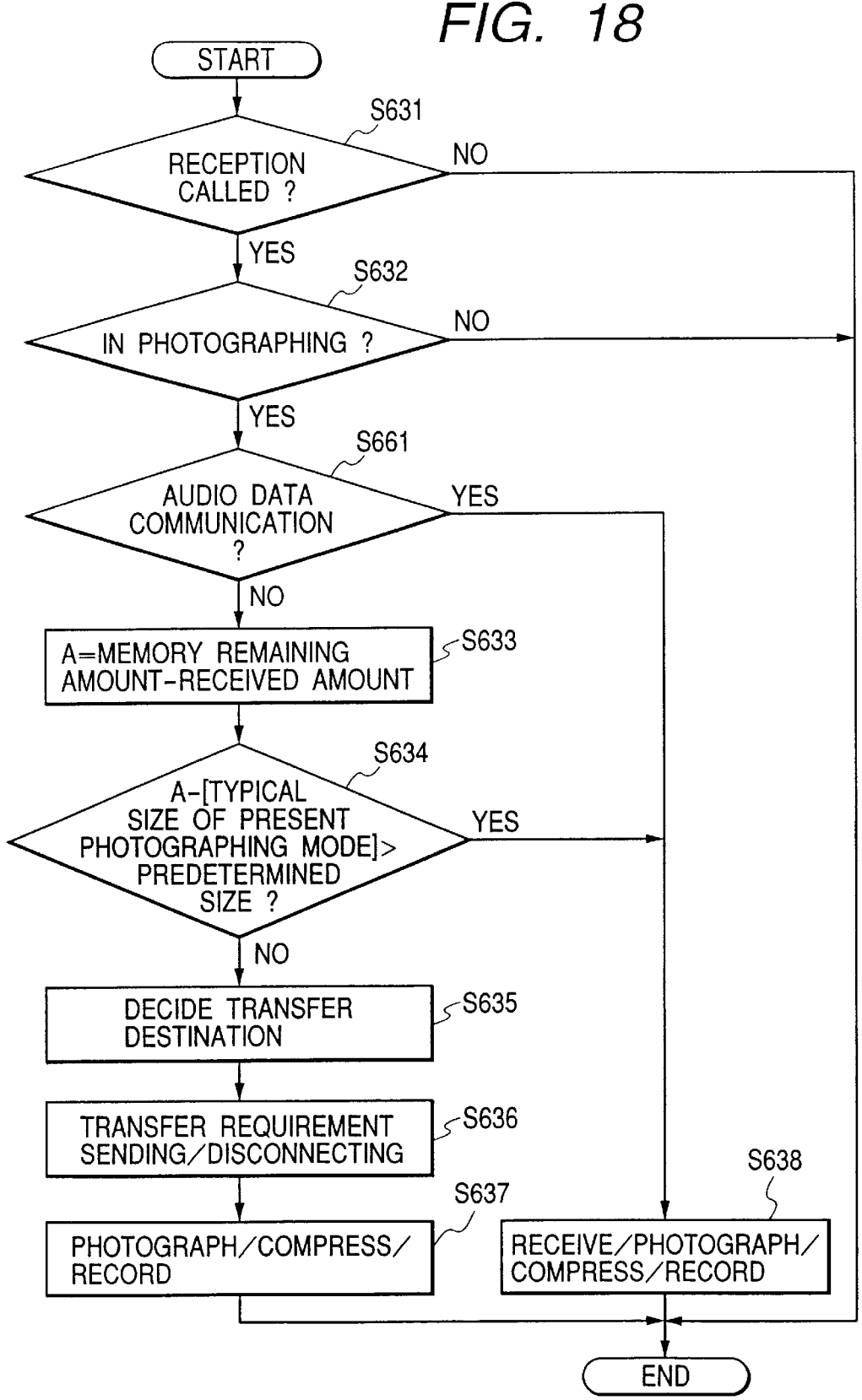
FIG. 18 is a flowchart illustrating programs for performing operation control for the above-mentioned digital camera in a fourth embodiment.

For this purpose, instead of the program of FIG. 15, a program according to a flowchart, for example, shown in FIG. 18 is used.

Additionally, in the flowchart of FIG. 18, the processing steps similar to those of the flowchart of FIG. 15 are denoted with the same reference numerals, and the detailed description thereof is omitted.

First, it is judged whether or not the communication unit 301 is in the reception called state (step S631), and it is then judged whether or not the image input unit 305 is in the photographing state (step S632). When these judgments result in the reception called state and the photographing state, the subsequent processing steps are executed; otherwise the present processing is ended.

When the units are in the reception called state and the photographing state, the control unit 308 judges whether or not audio communication or audio data reception (hereinafter referred to as the audio data communication) is starting in the communication unit 301 (step S661).

As a result of the judgment of the step S661, when the audio data communication is performed, the operation is compatible with the photographing operation. Therefore, the reception processing for the audio data communication, photographing processing, compression processing, and recording processing are continuously performed (step S638). Thereafter, the present processing is ended.

Additionally, in this case, for example, the message for informing the above-described operation is displayed on the color liquid crystal display 107 (electronic view finder), so that the user may select whether to start conversation with the partner. Moreover, when audio data such as voice mail is received, regeneration may be started.

Therefore, as the judgment result of the step S661, when the audio data communication is not to be performed, the processing by the above-described steps S633 to S637 is executed to avoid the conflict in the case where two operations of the data receiving operation and photographing operation occur with respect to the memory resource.

Additionally, in the fourth embodiment, when the communication unit 301 receives data including both audio data and image data, for example, the communication of only the audio data is first performed, and a request for resending of the image data is then issued to the partner. Thereby, after the audio data communication, the image data communication is performed.

Fifth Embodiment

A fifth embodiment will be described with reference to FIG. 19. In the first to fourth embodiments, when it is judged that if the data to be received is received, the capacity for storing the generated data does not remain in the recording medium, the data to be received is transferred to another device. In the fifth embodiment, however, data already stored in the recording medium is transmitted, and a vacant capacity for the transmitted data is secured in the recording medium, before the reception is performed.

Figure 19:
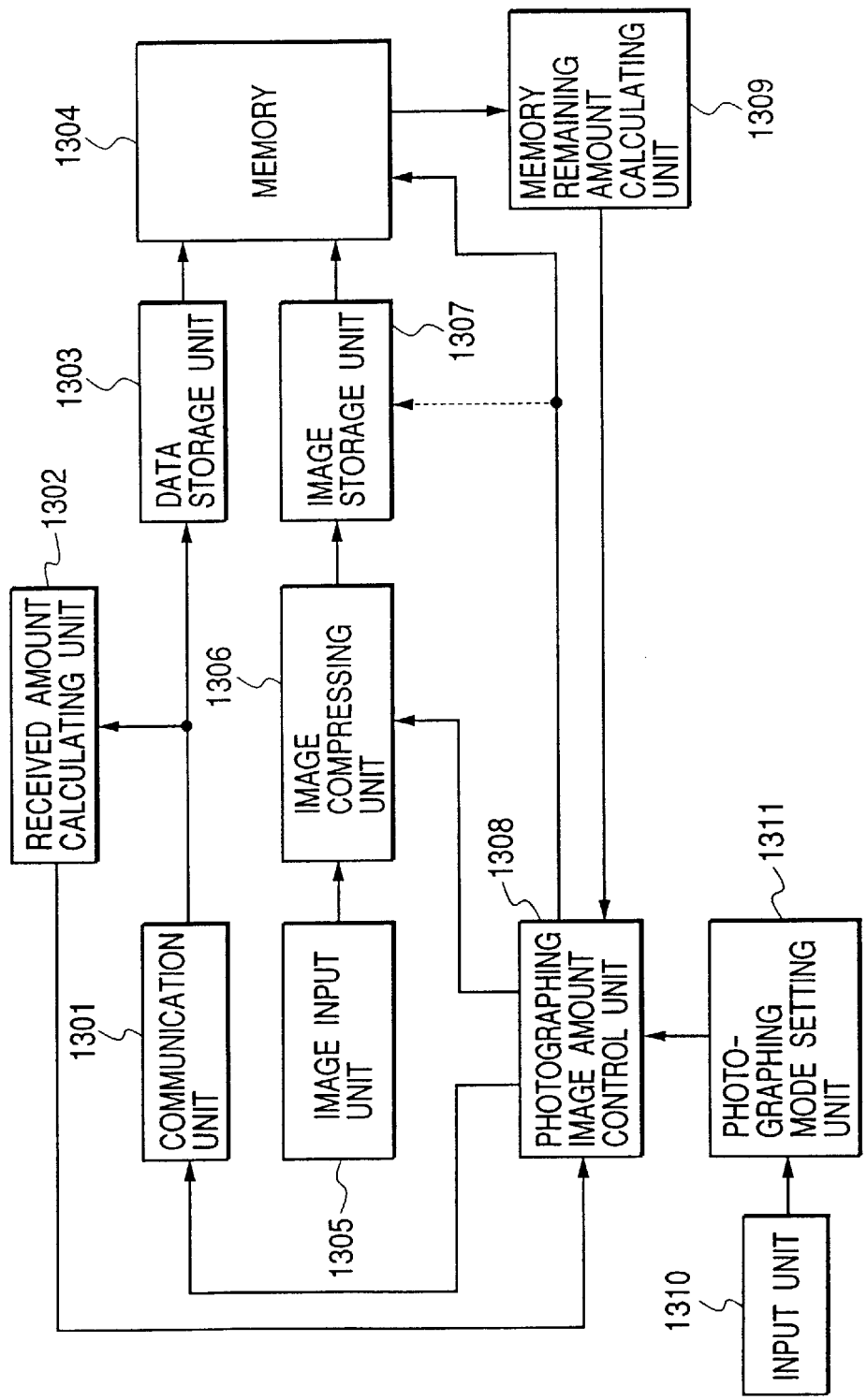
FIG. 19 is a block diagram of a fifth embodiment-showing a conceptual control flow of the above-mentioned digital camera.

In FIG. 19, the digital camera 100 is provided with a communication unit 1301, a received amount calculating unit 1302 and a data storage unit 1303 to which outputs of communication unit 1301 are supplied, a memory 1304 to which an output of data storage unit 1303 is supplied, an image input unit 1305, an image compressing unit 1306 to which an output of image input unit 1305 is supplied, and an image storage unit 1307 to which an output of image compressing unit 1306 is supplied. An output of image storage unit 1307 is also supplied to the memory 1304.

The digital camera 100 is also provided with a memory remaining amount calculatingunit 1309 to which an output of memory 1304 is supplied; an.input unit 1310; a photographing mode setting unit 1311 to which an output of input unit 1310 is supplied; and a photographing image amount control unit 1308 to which outputs of the above-described received amount calculating unit 1302, memory remaining amount calculating unit 1309 and photographing mode setting unit 1311 are supplied, and an output of photographing image amount control unit 1308 is supplied to the image compressing unit 1306.

Here, first the communication unit 1301 corresponds to the PHS unit 203.

The received amount calculating unit 1302 is realized by the software which is executed in the CPU 29 of the main CPU unit 201. The received amount calculating unit 1302 uses the communication protocol to calculate the data amount of data estimated to be received by the communication unit 1301 (estimated amount of received data).

The data storage unit 1303 stores the data received by the communication unit 1301 into the memory 1304 using the file system.

The memory 1304 corresponds to the flash ROM 32 (nonvolatile memory) of the main CPU 201.

The image input unit 1305 corresponds to the overall camera unit 204 which has the constitution shown in FIG. 6.

The image compressing unit 1306 is incorporated in the CPU 29, and is constituted so that the compressed image data size can be adjusted by changing the quantization table.

The image storage unit 1307 stores the image data compressed by the image compressing unit 1306 into the memory 1304 using the CPU 29.

The photographing image amount control unit 1308 is realized by the software of the CPU 29.

Specifically, by changing parameters such as the quantization table in the image compressing unit 1306, the compressing control is performed. That is, when it is judged by the indication from the memory remaining amount calculating unit 1309 that the remaining amount of the memory 1304 is small, the judgment is notified to the image compressing unit 1306 to change the compressibility in the image compressing unit 1306. Moreover, control is performed so that arbitrary image data is selected from the image data already stored in the memory 1304 and transmitted to the external apparatus. Thereafter, the transmitted image data is erased from the memory 1304.

The memory remaining amount calculating unit 1309 is realized by the software of the CPU 29, and uses the table of the file system constructed on the memory 1304 during the calculation of the remaining amount of the memory 1304.

The input unit 1310 corresponds to input switches such as the mode dial 101. Specifically, the unit is used in the case where the photographer indicates the photographing mode and in other cases.

The photographing mode setting unit 1311 sets the photographing mode by notifying the state of the mode dial 101 (input unit 1310) to the CPU 29 by the sub CPU 1 of the sub CPU unit 202.

Here, Table 2 shows examples of photographing modes for changing the image compressing unit 1306 by the photographing image amount control unit 1308, and memory sizes necessary for recording the image obtained by the photographing modes into the memory 1304.

TABLE 2

| Recording Image Mode | Necessary Memory Size per Sheet |
|---|---|
| Economy | 25 KB |
| Normal | 50 KB |
| Fine | 100 KB |

As shown in Table 2, here, the photographing mode is set to three stages: ECONOMY mode; NORMAL mode; and FINE mode, and the memory size necessary for recording one sheet of image is set to 25 KB, 50 KB, and 100 KB.

Moreover, when the image data is stored in the memory 1304, for example, a storage management table as shown in Table 3 is prepared. The storage management table is prepared in an inner memory or the memory 1304 by the photographing image amount control unit 1308.

TABLE 3

| Name | size | Record Date/ Time | Access Date/ Time | Access Frequency | Mark | Used Color No. | Storage Place |
|---|---|---|---|---|---|---|---|
| MX0001.jpg | 25 KB | 1996 Dec. 25 PM3:00 | 1997 Jan. 7 PM10:00 | 3 | x | 32768 | 100 |
| MX0002.jpg | 50 KB | 1996 Dec. 31 AM9:45 | 1996 Dec. 31 AM9:45 | 1 | o | 65536 | 125 |
| MX0003.jpg | 100 KB | 1997 Jan. 3 PM2:10 | 1997 Jan. 5 AM3:00 | 1 | x | 37 | 175 |
| MX0004.jpg | 50 KB | 1997 Jan. 7 AM10:30 | 1997 Jan. 7 AM9:30 | 7 | x | 65536 | 275 |

As shown in Table 3, the storage management table comprises information such as image size, recording time, access date and time, access frequency, marking information, used color number, and storage place. Here, the storage management table is shown in the case where the image data of four sheets MX0001.jpg to MX0004.jpg (image data compressed by JPEG system) are stored in the memory.

Additionally, the marking information is input by operating the input unit 1310 (switches, and the like) by the photographer. Specifically, when photographing is performed, the photographer grasps to some degree whether or not the photographed image is important. Therefore, when the photographer judges that the photographed image is important, the input unit 1310 is used to input the marking information (provided with the priority with respect to the photographed image). The input marking information is recorded as the marking information of the photographed image data into the storage management table. Therefore, by referring to the marking information of the storage management table, it can be judged whether or not the image data is important.

A processing by the software for implementing the most characteristic operation in the digital camera 100 will be described hereinafter.

Figure 20:
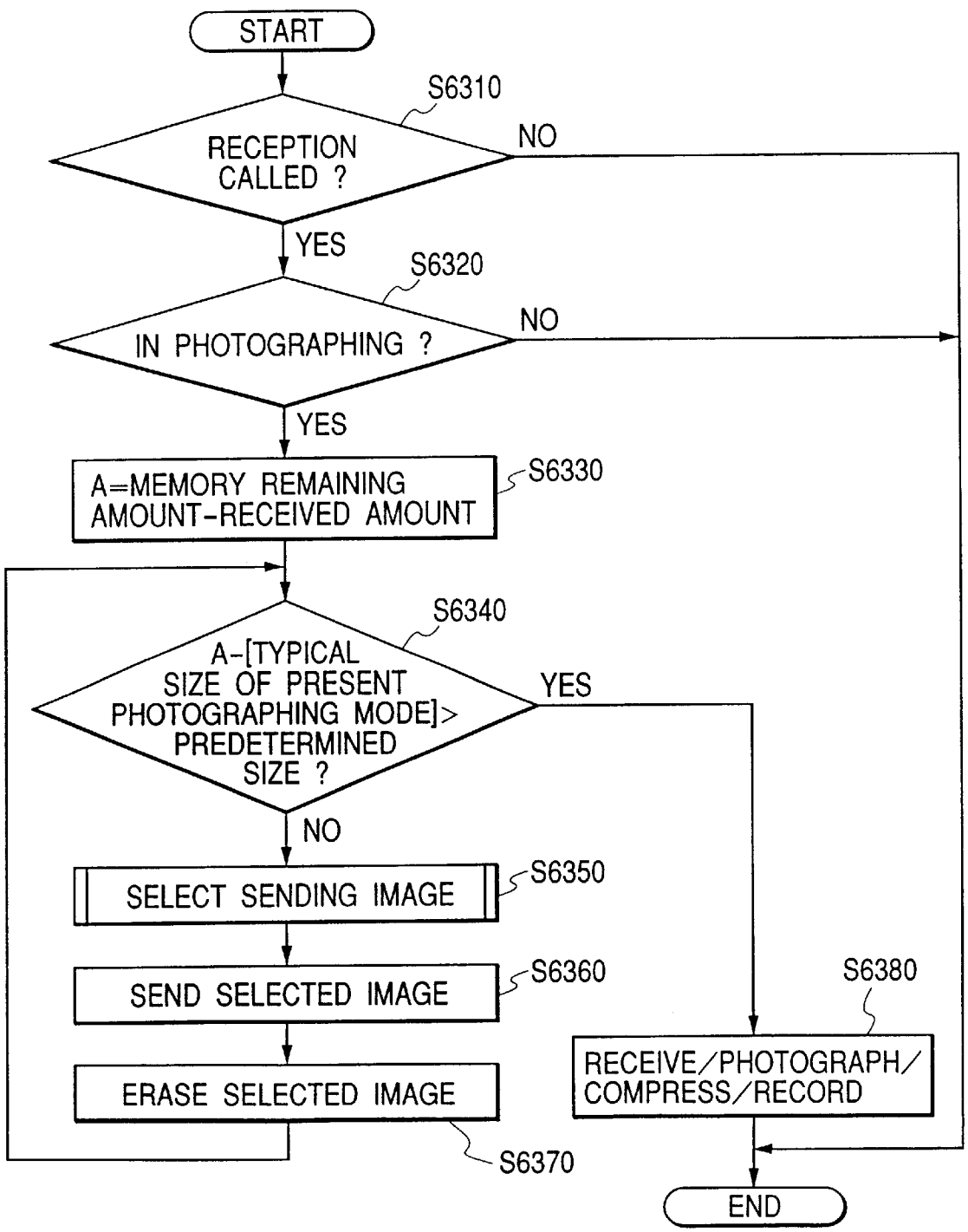
FIG. 20 is a flowchart illustrating programs for performing operation control for the above-mentioned digital camera.

A program according to a flowchart, for example, shown in FIG. 20 is stored beforehand in the ROM 32 of the main CPU unit 201, and the program is read and executed by the CPU 29, so that the digital camera 100 operates as follows.

First, it is judged whether or not the communication unit 301 (PHS unit 203) is in the reception called state (step S6310), and it is also judged whether or not the image input unit 1305 (camera unit 204) is in the photographing state (step S6320).

When these judgments result in the reception called state and the photographing state, the subsequent processing steps are executed; otherwise the present processing is ended.

Additionally, the judgment of the step S6320 concerning whether or not the unit is in the photographing state is performed by detecting whether the shutter button 102 is half or completely depressed. Alternatively, it is detected whether CAMERA mode is set by the mode dial 101.

When the units are in the reception called state and the photographing state, the photographing image amount control unit 1308 obtains value A by subtracting the estimated amount of the received data calculated by the received amount calculating unit 1302 from the remaining amount of the memory 1304 calculated by the memory remaining amount calculating unit 1309 (step S6330).

Here, for the estimated amount of the received data, for example, the estimated amount of data obtained by receiving E-mail is calculated. Specifically, the above-described POP 3 is used as the communication protocol, and LIST and STAT commands of POP 3 are used in the step S615 of requiring the information of plural types for the server in the program as shown in FIG. 13 to calculate the amount.

Subsequently, the photographing image amount control unit 1308 obtains the typical compressed image size for the present photographing mode set by the photographing mode setting unit 1311 from the Table 2, and subtracts the obtained image size from the value A obtained in the step S6330. Then, it is judged whether or not the result exceeds the value of the predetermined amount (step S6340).

Here, the reason why the value of the predetermined amount is used as the offset is that it is difficult to predict the compressed image size in the compression of JPEG system or the like and that only the typical size of the compressed image can be predicted. By setting the value of the predetermined amount to be large, it is possible to secure the predetermined amount of sheets of photographed image even after the communication ends.

As a result of the judgment of the step S6340, when the subtracted value exceeds the value of the predetermined amount, this indicates that there is an allowance in the remaining amount of the memory 1304. Therefore, the reception processing, photographing processing, compression processing, and recording processing are continuously performed (step S6380), thereby ending the present processing.

As a result of the judgment of the step S6340, when the subtracted value does not exceed the value of the predetermined amount, the photographing image amount control unit 1308 selects image data to be sent to another apparatus from the image data stored in the memory 1304 as detailed later in order to increase the remaining amount of the memory 1304 (step S6350).

Subsequently, the photographing image amount control unit 1308 controls the communication unit 1301 so that the image data selected in the step S6350 is read from the memory 1304 and sent to another apparatus (step S6360).

Additionally, the transmission destination herein may be a partner called in the step S6310, or a specific server designated beforehand. For example, when the data is sent to the specific server designated beforehand, and the server is not the partner called in the step S6310, the communication with the called partner is temporarily disconnected, and communication is performed with the server to which the data is to be sent. When the communication is finished, the called partner is connected to perform communication.

After the processing of the step S6360, the photographing image amount control unit 1308 erases the image data sent by the communication unit 1301 from the memory 1304 (step S6370). Therefore, the remaining amount of the memory 1304 increases.

Thereafter, the processing returns to the step S6340, and the subsequent processing steps are repeatedly performed.

Figure 21:
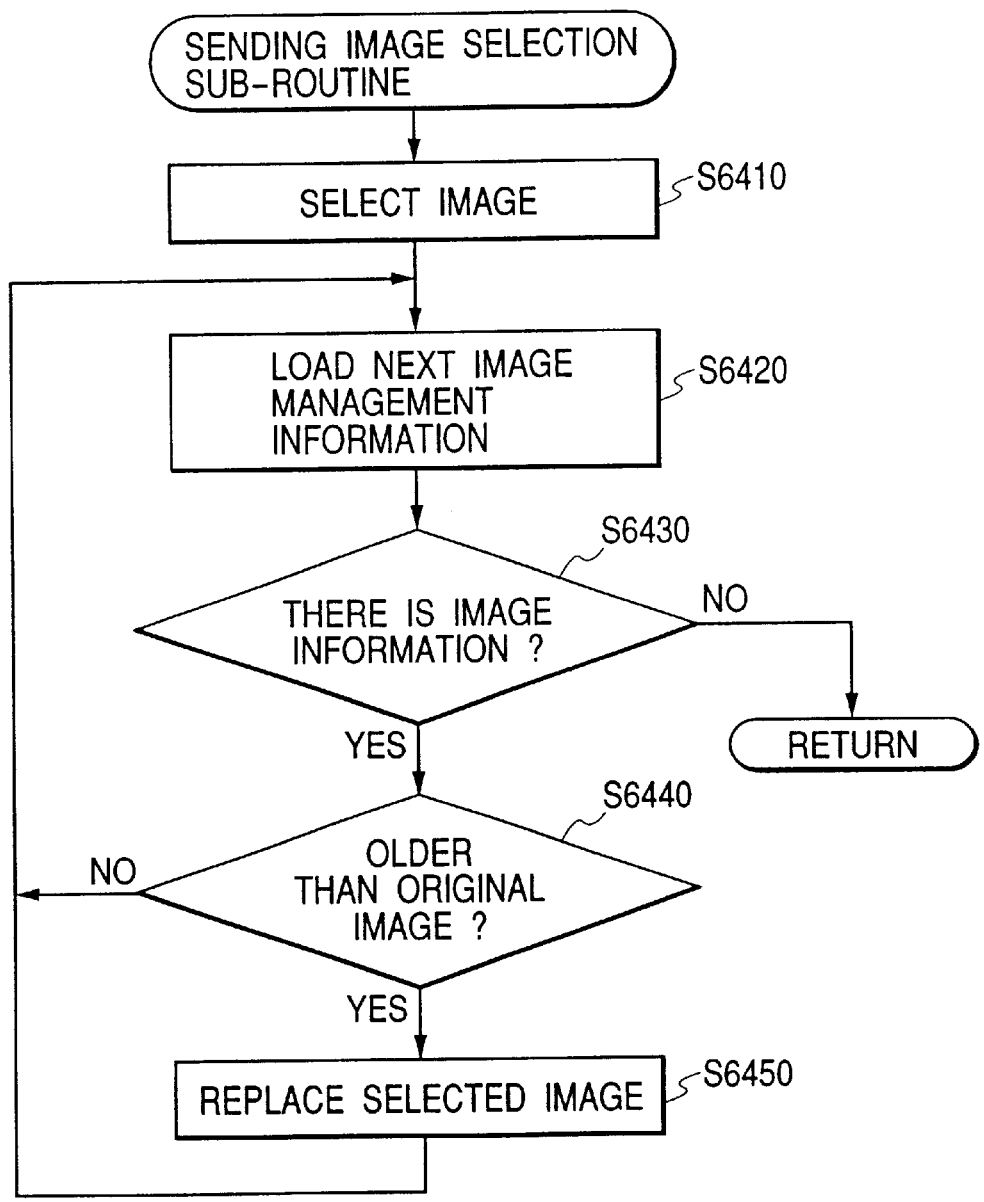
FIG. 21 is a flowchart illustrating one example of transmission-image selection processing in the above-mentioned operation control.

FIG. 21 is a flowchart showing one example of an image selection processing in the above-described step S6350.

First, in the storage management table shown in Table 3, the image data shown by the top management information is selected as tentative image data to be sent (step S6410).

Subsequently, the management information next to the management information for the image data selected in the step S6410 is loaded (step S6420).

Then, it is judged whether or not the management information can normally be loaded in the step S6420 (step S6430).

As a judgment result of the step S6430, when the information cannot be loaded, the image data tentatively selected in the step S6420 is oldest, and following the image data, no image data exists. Therefore, the image data tentatively selected in the step S6420 is determined as the image data to be sent. Subsequently, the processing returns to the processing of the flowchart of FIG. 20.

As the judgment result of the step S6430, when the information can normally be loaded, it is judged whether or not the image data shown by the loaded management information is older than the image data tentatively selected in the step S6420 (step S6440). The judgment is performed using the recording date and time (preparing date and time) included in the management information.

As a judgment result of the step S6440, when the image data is older than the tentative image data, the image data shown by the management information loaded in the step S6420 is regarded as the tentative image data to be transmitted. Thereafter, the processing returns to the step S6420, in which the next management information is loaded.

As the judgment result of the step S6440, when the image data is not older than the tentative image data, the processing returns to the step S6420 as it is, in which the next management information is loaded.

Additionally, in the above-described image selection processing, in the step S6440, the data having the older preparing date and time is preferentially selected as the image data to be transmitted, but the processing is not limited to this. Examples of the reference for selecting the image data to be transmitted are as follows:

EXAMPLE 1

Figure 22:
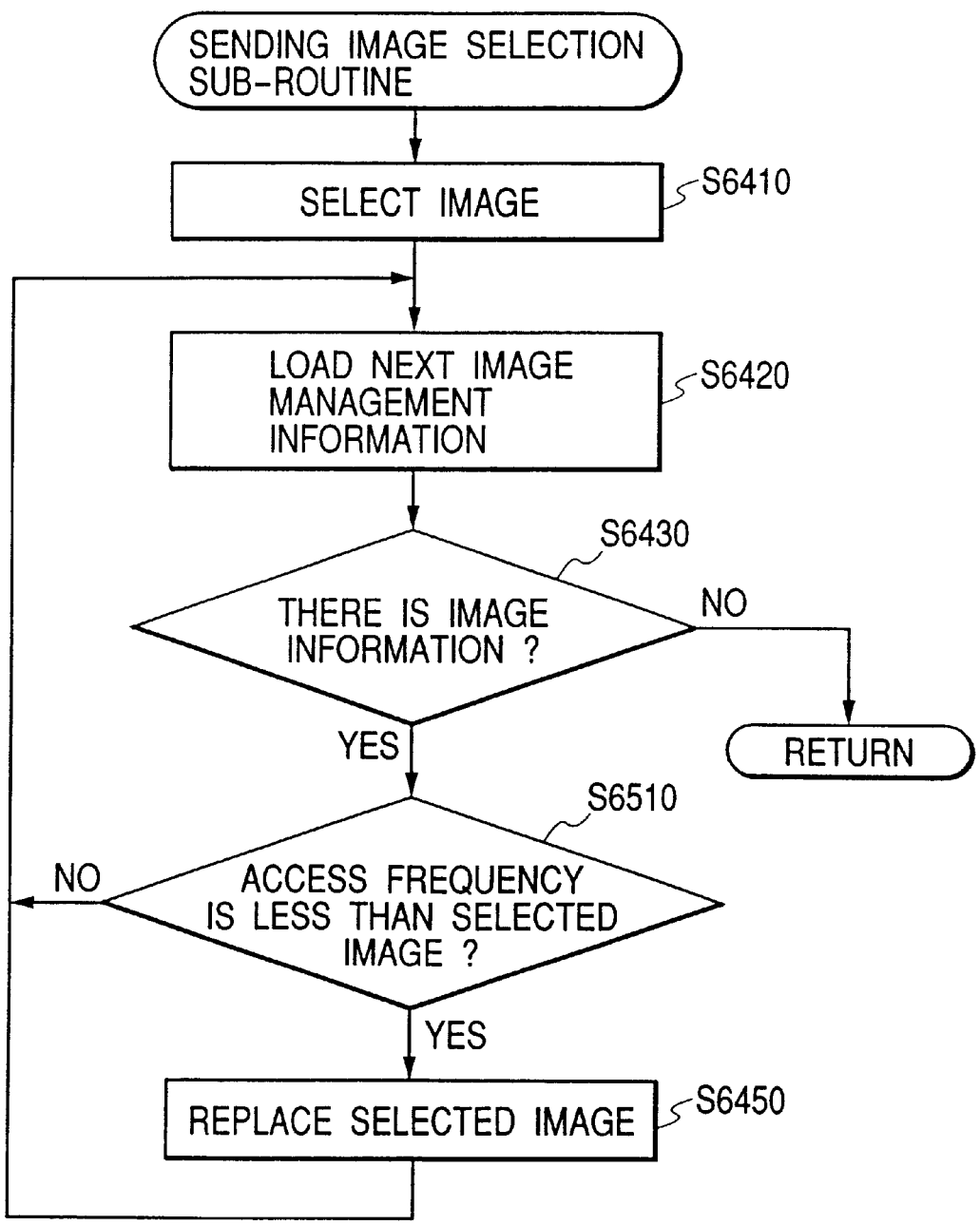
FIG. 22 is a flowchart illustrating another example of the above-mentioned transmission-image selection processing.

As shown in FIG. 22, by step S6510 provided instead of the step S6440, the data having less access frequencies (less purposes) is preferentially selected as the image data to be transmitted. In the judgment, the access frequency included in the management information is used.

EXAMPLE 2

The image data having less number of used colors is preferentially selected as the image data to be transmitted. This is because there is a high possibility that data having less number of colors is sometimes failure image data such as strobe issuance mistake. In this case, the number of used colors included in the management information is used in the judgment.

EXAMPLE 3

The unimportant image data is preferentially selected as the image data to be transmitted by the marking information input by the photographer.

Sixth Embodiment

The digital camera in a sixth embodiment has a constitution similar to that of the digital camera 100 in the fifth embodiment (see FIG. 19), but is different in the overall control.

Specifically, in this embodiment, the communication operation in the communication unit 301 and the photographing operation in the image input unit 305 are overlapped. Therefore, when a shortage of the remaining amount of the memory 1304 occurs, the image data selected by executing the image selection processing (sending image selecting function) as shown in FIG. 21 (or FIG. 22) is transmitted after the photographing operation.

Specifically, in order to value a response as the camera for the user, first the photographing operation is performed. Then, for the timing to record the image obtained by the photographing operation into the memory 1304 by the image storage unit 1307, the recording is performed after the image data selected by the image selection processing is transmitted. Since the image storage unit 1307 is realized by the CPU 29, EDODRAM 30, and software control (see FIG. 5), the image data obtained by the photographing operation is stored in the EDODRAM 30, until the transmission of the selected image data is completed.

Figure 23:
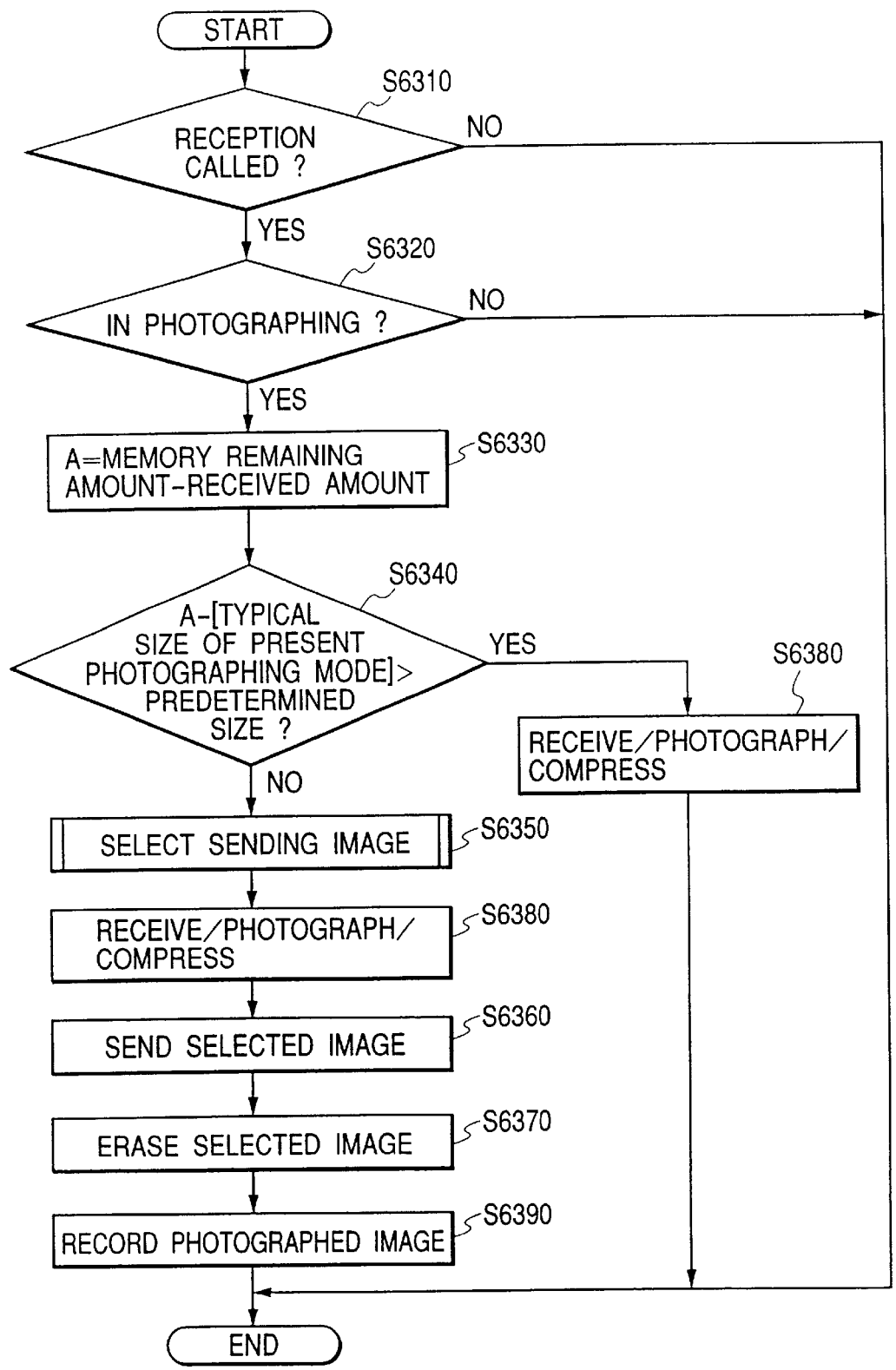
FIG. 23 is a flowchart illustrating programs for performing operation control for the above-mentioned digital camera in a sixth embodiment.

For this purpose, instead of the program of FIG. 20, for example, a program according to a flowchart shown in FIG. 23 is used. By executing this program, the conflict in the case where two operations of the data receiving operation and photographing operation occur with respect to the memory resource can be avoided.

Additionally, in the flowchart of FIG. 23, the steps performing the processings similar to those in the flowchart of FIG. 20 are denoted with the same reference numerals, and the detailed description thereof is omitted.

First, it is judged whether or not the communication unit 1301 is in the reception called state (step S6310), and it is then judged whether or not the image input unit 1305 is in the photographing state (step S6320). When these judgments result in the reception called state and the photographing state, the subsequent processing steps are executed; otherwise the present processing is ended.

When the units are in the reception called state and the photographing state, the photographing image amount control unit 1308 obtains the value A by subtracting the estimated amount of the received data from the remaining amount of the memory 1304 (step S6330), then the typical size of the compressed image for the present photographing mode is subtracted from the value A, and it is judged whether or not the result exceeds the value of the predetermined amount (step S6340).

Furthermore, as a result of the judgment of the step S6340, when the subtracted value exceeds the value of the predetermined amount, this indicates that there is an allowance in the remaining amount of the memory 1304. Therefore, the reception processing, photographing processing, compression processing, and recording processing are continuously performed, thereafter ending the present processing.

On the other hand, as the judgment result of the step S6340, when the subtracted value does not exceed the value of the predetermined amount, in order to increase the remaining amount of the memory 1304, the photographing image amount control unit 1308 first selects the image data to be sent to another apparatus from the image data stored in the memory 1304 according to the flowcharts shown in FIG. 21 or 22 (step S6350).

Subsequently, the receiving processing, photographing processing, compression processing, and recording processing are performed (step S6380). In this case, the photographing image amount control unit 1308 controls the image recording unit 1307 so as to record the image data obtained by the photographing operation once in the EDODRAM 30.

Subsequently, the photographing image amount control unit 1308 controls the communication unit 1301 so that the image data selected in the step S6350 is read from the memory 1304 and sent to another apparatus (step S6360).

Next, the photographing image amount control unit 1308 erases the image data sent by the communication unit 1301 from the memory 1304 (step S6370). Therefore, the remaining amount of the memory 1304 increases.

Thereafter, the photographing image amount control unit 1308 controls the image recording unit 1307 so as to record the image data once stored in the EDODRAM 30 (volatile memory) into the memory 1304 (nonvolatile memory) (step S6390). Thereafter, the present processing is ended.

Therefore, in this case, after the image data is sent to another apparatus, the image data obtained by the photographing operation is written into the memory 1304.

Seventh Embodiment

The digital camera in a seventh embodiment has a constitution similar to that of the digital camera 100 in the fifth embodiment (see FIG. 19), but is different in the overall control.

Specifically, in this embodiment, only when the reception from the specific partner is performed in the communication unit 1301, the image data selected by executing the image selection processing (sending image selecting function) as shown in FIG. 21 (or FIG. 22) is sent after the photographing operation.

Figure 24:
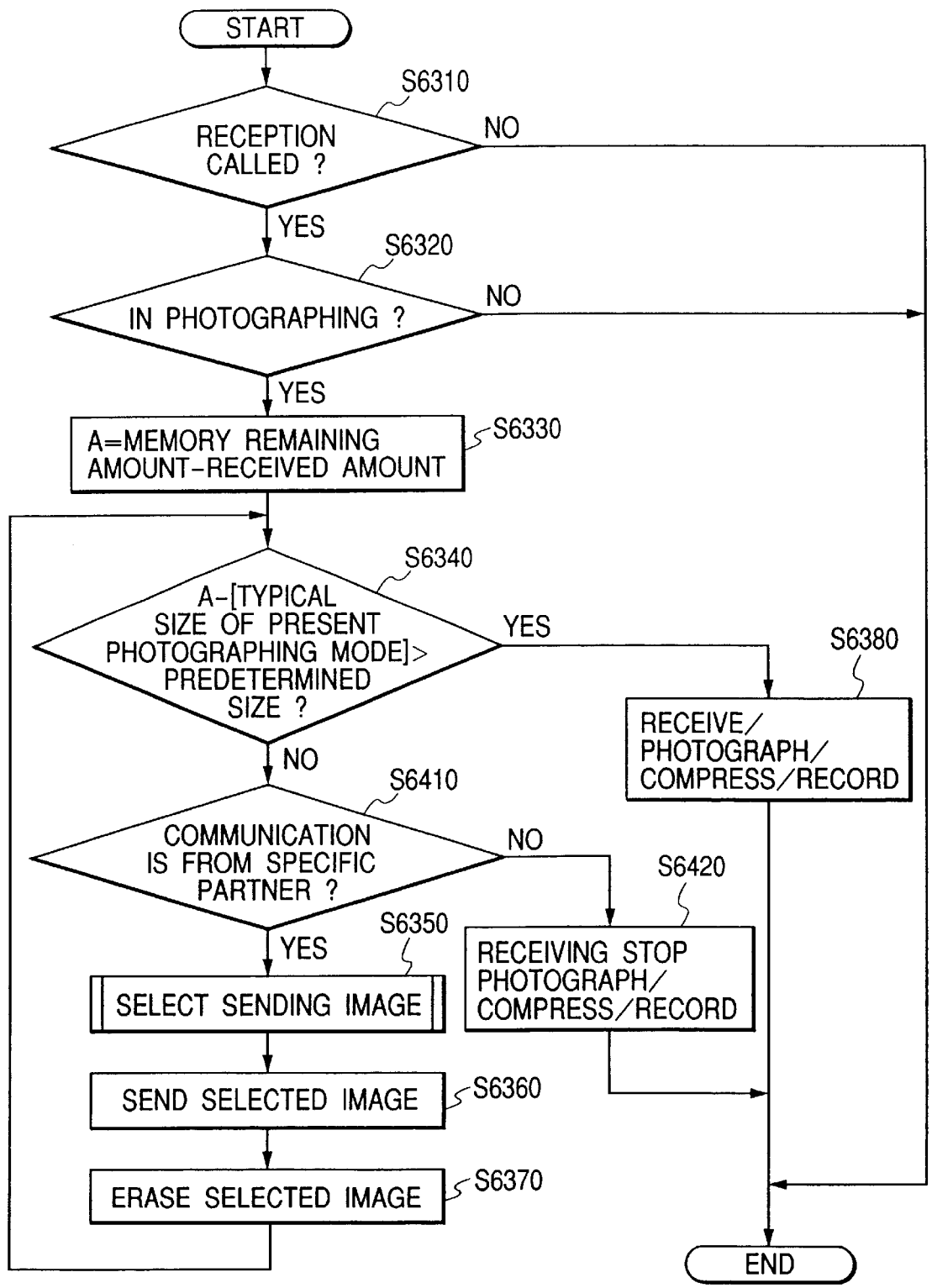
FIG. 24 is a flowchart illustrating programs for performing operation control for the above-mentioned digital camera in a seventh embodiment.

For this purpose, instead of the program of FIG. 20, a program according to a flowchart, for example, shown in FIG. 24 is used.

Additionally, in the flowchart of FIG. 24, the processing steps similar to those of the flowchart of FIG. 20 are denoted with the same reference numerals, and the detailed description thereof is omitted.

First, it is judged whether or not the communication unit 1301 is in the reception called state (step S6310), and it is then judged whether or not the image input unit 1305 is in the photographing state (step S6320). When these judgments result in the reception called state and the photographing state, the subsequent processing steps are executed; otherwise the present processing is ended.

When the units are in the reception called state and the photographing state, the photographing image amount control unit 1308 obtains the value A by subtracting the estimated amount of the received data from the remaining amount of the memory 1304 (step S6330). Thereafter, the typical size of the compressed image for the present photographing mode is subtracted from the value A, and it is judged whether or not the result exceeds the value of the predetermined amount (step S6340).

As a result of the judgment of the step S6340, when the subtracted value exceeds the value of the predetermined amount, this indicates that there is an allowance in the remaining amount of the memory 1304. Therefore, the reception processing, photographing processing, compression processing, and recording processing are continuously performed (step S6380), thereby ending the present processing.

On the other hand, as the judgment result of the step S6340, when the subtracted value does not exceed the value of the predetermined amount, the photographing image amount control unit 1308 judges whether or not the image data is received from the specific partner in the communication unit 1301 (step S6410). The judgment is realized, for example, by using the transmission number obtained from transmission number service, grasping the transmission number of the partner, and comparing the number with the transmission number preset by the user (number of the specific partner).

As the judgment result of the step S6410, when the specific partner is not judged, the photographing image amount control unit 1308 controls the communication unit 1301 to stop the receiving operation. Thereby, the receiving operation is not performed in the communication unit 1301. On the other hand, the photographing processing, compression processing, and recording processing are continuously performed (step S6420). Thereafter, the present processing is ended.

As the judgment result of the step S6410, when the specific partner is judged, the photographing image amount control unit 1308 selects the image data to be transmitted to another apparatus from the image data stored in the memory 1304 according to the flowchart shown in FIG. 20 or 21 (step S6350).

Subsequently, the photographing image amount control unit 1308 controls the communication unit 1301 to read the image data selected in the step S6350 from the memory 1304 and send the data to another apparatus (step S6360), and erases the image data from the memory 1304 (step S6370). Therefore, the remaining amount of the memory 1304 increases.

Thereafter, the processing returns to the step S6340, and the subsequent processing steps are repeatedly performed.

Eighth Embodiment

The digital camera in a eighth embodiment has a constitution similar to that of the digital camera 100 in the fifth embodiment (see FIG. 19), but is different in the overall control.

Specifically, in this embodiment, even when data including not only image data but also audio data are received in the communication unit 1301, the conflict resulting from the case where two operations, data receiving operation and photographing operation, occur with respect to the memory resource is avoided.

Figure 25:
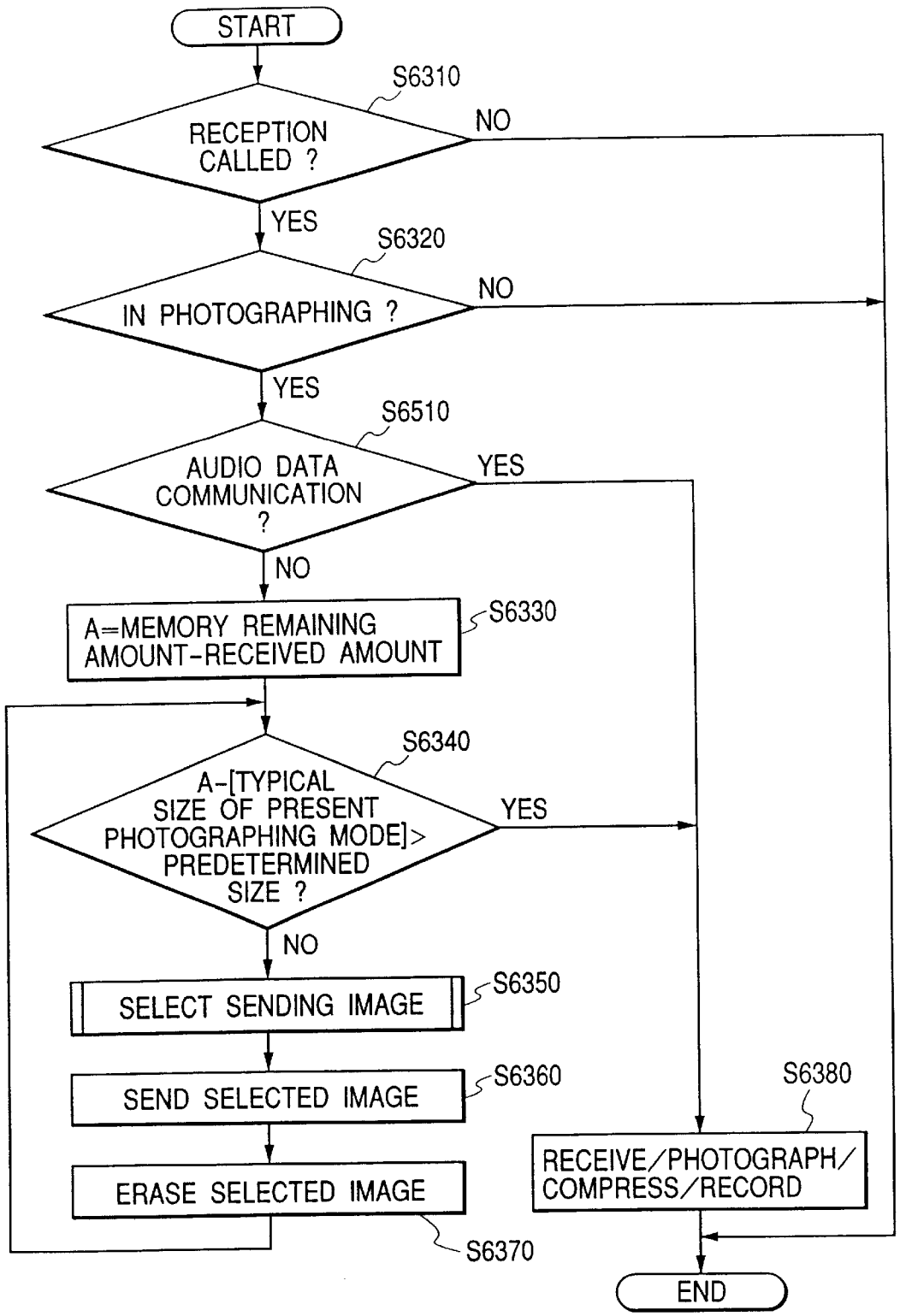
FIG. 25 is a flowchart illustrating programs for performing operation control for the above-mentioned digital camera in an eighth embodiment.

For this purpose, instead of the program of FIG. 20, a program according to a flowchart, for example, shown in FIG. 25 is used.

Additionally, in the flowchart of FIG. 25, the processing steps similar to those of the flowchart of FIG. 20 are denoted with the same reference numerals, and the detailed description thereof is omitted.

First, it is judged whether or not the communication unit 1301 is in the reception called state (step S6310), and it is then judged whether or not the image input unit 1305 is in the photographing state (step S6320). When these judgments result in the reception called state and the photographing state, the subsequent processing steps are executed; otherwise the present processing is ended.

When the units are in the reception called state and the photographing state, the photographing image amount control unit 1308 judges whether or not audio communication or audio data reception (hereinafter referred to as the audio data communication) is performed in the communication unit 1301 (step S6510).

As a result of the judgment of the step S6510, when audio data communication is performed, the operation is compatible with the photographing operation. Therefore, the reception processing for the audio data communication, photographing processing, compression processing, and recording processing are continuously performed (step 86380). Thereafter, the present processing is ended.

Additionally, in this case, for example, the message for informing the above-described operation is displayed on the color liquid crystal display 107 (electronic view finder), so that the user may select whether to start conversation with the partner. Moreover, when audio data such as voice mail is received, regeneration may be started.

Therefore, as the judgment result of the step S6510, when audio data communication is not performed, the processing by the above-described steps S6330 to S6370 is executed to avoid the conflict in the case where two operations of the data receiving operation and photographing operation occur with respect to the memory resource.

Additionally, in the eighth embodiment, when the communication unit 1301 receives the data including both the audio data and the image data, for example, the communication only of the audio data is first performed, and subsequently the request for resending the image data is issued to the partner. Thereby, after the communication of the audio data, the communication of the image data is performed.

Moreover, needless to say, the object of the present invention is also attained by providing a system or a device with a storage medium in which the program code of the software for realizing the functions of the host computer and terminals according to the above-described embodiments is stored, and by reading and executing the program code stored in the storage medium by the system or the device computer (or CPU or MPU).

In this case, the program code itself read from the storage medium realizes the above-described functions of the embodiments, and the storage medium in which the program code is stored constitutes the present invention.

As the storage medium for supplying the program code, ROM, floppy disk, hard disk, optical disk, optomagnetic disk, CD-ROM, CD-R, magnetic tape, nonvolatile memory card, and the like can be used.

Moreover, by executing the program code read by the computer, the above-described function of each embodiment is realized, but needless to say, there is also included the constitution which comprises performing a part or the whole of an actual processing by OS or the like operating on the computer based on the instruction of the program code to realize the function of each embodiment by the processing.

Furthermore, needless to say, there is also included the constitution which comprises writing the program code read from the storage medium into a memory disposed on a function expansion board inserted into the computer or a function expansion unit connected to the computer based on the instruction of the program code, and performing a part or the whole of the actual processing by a CPU or the like disposed on the function expansion board or the function expansion unit, so that the function of each embodiment is realized by the processing.

Additionally, in the above description, the case using POP 3 has been described, but of course, the present invention is not limited to this case. Any program can be utilized in the present invention as long as the size of the received data in the process of communication is seen.

As described above, according to the present invention, the problem that the generated data cannot be recorded due to the transmitted data can be prevented. Particularly, when the present invention is applied to a digital camera or the like, the problem that photographed data cannot be recorded because of transmitted data can be solved.

If the transmitted data is transferred, it can be confirmed later, but considering that the scene to be photographed is momentary and could not be seen twice, it is significant to constantly provide an allowance to record the photographed image.

Moreover, in this constitution, it is possible to retain the image data (second data) obtained by photographing as intended by the user, and it is unnecessary to erase the image data previously photographed and stored in the memory to secure the memory remaining amount. Moreover, since the transmission instruction itself can momentarily be given, the instantaneous property of photographing is not lost.

Furthermore, in the above-described case, the data to be received is transmitted, and additionally, only a part of the data to be received (third data such as information to hold the outline of the data to be received) is received. Alternatively, while the data to be received is transmitted, the information concerning the data to be received (information such as data size and transmission destination) is retained.

In this constitution, the instantaneous property of the data to be received can be kept.

Moreover, when the reception is performed from the predetermined specific communication partner, by perform-ing the transmission of the data to be received, the priority of photographing and communication can be controlled by the communication partner. Therefore, only the communication from the specific partner can be received in preference to the photographing.

Furthermore, when the received data is other than audio data, by performing the transmission of the data to be received, talking or the like and photographing are compatible during the reception of the audio data.

Additionally, as described above, according to the present invention, the non-storage amount of the memory (storage means) in which the second data (image data obtained by photographing, and the like) and the first data (received data) are stored is managed. When the non-storage amount is equal to or less than the predetermined amount, the data already stored in the memory is transmitted to the outside. This is effective when the received data is to be confirmed as quickly as possible, because different from the first to fourth embodiments, the transmitted data is preferentially taken.

Specifically, for example, the total data size is obtained by adding the received data (first data) to the estimated size of the photographed image data (second data) obtained by the photographing operation in the designated photographing mode, and the total data size is compared with the non-storage amount (remaining amount) of the memory. As a result of the comparison, when the total data size is larger than the remaining amount of the memory, the information concerning the data already stored in the memory (recording time information, access frequency information, marking information added from the outside, and the like) is used to select the oldest information, the information having less access frequency, or the information to which no marking information is added from the user from the data already stored in the memory, and the selected data is transmitted to another apparatus, and the like.

In this constitution, the photographed image data can be retained as intended by the user, and no photographed image data is lost. Moreover, when the data to be transmitted is selected, by using the above-described marking information, the data provided with the priority by the user is prevented from being transmitted.

Moreover, when the data transmission is constituted to be performed before the photographing of a new image, the memory amount necessary is secured at the time of actual photographing. Therefore, the photographed image data as well as the received data can securely be stored in the memory.

Furthermore, when the data transmission is constituted to be performed after the photographing of a new image, the user can perform photographing without missing the photographing timing. In this case, for example, the photographed image data is first stored in a volatile memory, such as DRAM. After the data transmission, the stored photographed image data is stored in the nonvolatile memory.

Additionally, the data transmission is constituted to be performed while data is received from a specific partner. In this constitution, since the priority of the communication partner can be given, failure in the communication from a specific partner can be prevented.

Moreover, the data transmission is constituted to be performed only when data other than audio data is received. Then, talking or the like and photographing operations are compatible.

As described above, according to the present invention, in a device or the like in which a digital camera and a communication apparatus are integrally formed, the drawback of a collision in the memory resource can be solved. In this case, by utilizing marking information from the user as means for selecting the data to be transmitted, rational judgment can be performed. Moreover, the requirements of both the highly reliable communication and the highly instantaneous photographing operation can be satisfied, and a compact and handy device or system can be constituted. Furthermore, even in the photographing place, quick photographing and communication reliability can be secured without missing any shutter chance (photo opportunity).

Additionally, in the present invention, since the control is constituted to be realized by controlling the CPU, the memory, and the like, the constitution can easily be realized even in a usual transmission device, a digital camera provided with a transmission device interface, and the like. Therefore, in the present invention, a digital camera, and the like, can be reduced in size, power consumption and cost, and the present invention can be said to be significant also in the future.

Moreover, in the present invention, even when there is no sufficient capacity to record the transmitted data in the memory, all the transmitted data can be obtained without compressing the data or discarding a part of the data.

What is claimed is:

1. An information processing apparatus comprising:
   reception means which receives data:
   data generation means which generates data; and
   control means which controls recording of first data received by said reception means and second data generated by said data generation means into a storage medium,
   wherein said control means controls recording of the first data into the storage medium so that the second data may be stored in an unrecorded storage region of the storage medium when the first data is received, and
   wherein said control means includes transmission means which sends to a transmission side apparatus an instruction regarding transfer of the first data to another apparatus when a difference between an unrecorded storage capacity of the storage medium and an amount of the first data is less than a predetermined value.

2. An information processing apparatus according to claim 1, wherein said data generation means includes image pickup means and generates image data picked up by said image pickup means as the second data.

3. An information processing apparatus according to claim 2, wherein said image pickup means has a plurality of operation modes each relating to a data size of an image to be photographed; and
   wherein for each operation mode the predetermined value is a value larger than at least a data amount of the image to be photographed.

4. An information processing apparatus according to claim 1, wherein when sending an instruction regarding transfer, said control means stores in the storage medium information relating to the first data.

5. An information processing apparatus comprising:
   reception means which receives data;
   data generation means which generates data; and
   control means which controls recording of first data received by said reception means and second data generated by said data generation means into a storage medium,
   wherein said control means controls recording of the first data into the storage medium so that the second data may be stored in an unrecorded storage region of the storage medium when the first data is received, and
   wherein said control means includes transmission means which sends to another apparatus data which corresponds to at least an amount of the first data from data stored in the storage medium when a difference between an unrecorded storage capacity of the storage medium and an amount of the first data is less than a predetermined value.

6. An information processing apparatus according to claim 5, wherein said data generation means includes image pickup means and generates image data picked up by said image pickup means as the second data.

7. An information processing apparatus according to claim 6, wherein said image pickup means has a plurality of operation modes each relating to a definition of an image to be photographed; and
   wherein said control means includes processing means which, when operating in a mode, processes the predetermined value in such a way that the predetermined value may be larger than at least a data amount of an image according to the mode.

8. An information processing apparatus according to claim 5, further comprising:
   selection means which selects data to be sent, wherein said selection means is used to send data selected by a user.

9. An information processing apparatus according to claim 1, wherein said data generation means includes acceptance means which accepts a manual instruction of a user for data generation.

10. An information processing method comprising the steps of:
    receiving data;
    generating data; and
    controlling recording of first data received in said receiving step and second data generated in said data generating step in a storage medium,
    wherein said controlling step controls recording of the first data into the storage medium in such a way that the second data may be stored in an unrecorded storage region of the storage medium when the first data is received, and
    wherein said controlling step comprises a transmission step which sends to a transmission side apparatus an instruction that the first data is to be transferred to another apparatus when a difference between an amount of an unrecorded storage capacity of the storage medium and an amount of the first data is less than a predetermined value.

11. A method according to claim 10, wherein said data generating step comprises an image pickup step and generates image data picked up in said image pickup step as the second data.

12. A method according to claim 11, wherein said image pickup step has a plurality of operation modes each relating to a data size of an image to be photographed; and
    wherein for each operation mode the predetermined value is a value larger than at least a data amount of the image to be photographed.

13. A method according to claim 10, wherein said controlling step stores information relating to the first data in the storage medium when the instruction regarding transfer is sent.

14. An information processing method comprising the steps of:
    receiving data;
    generating data; and
    controlling recording of first data received in said receiving step and second data generated in said data generating step in a storage medium, wherein said control step controls recording of the first data into the storage medium in such a way that the second data may be stored in an unrecorded storage region of the storage medium when the first data is received, and wherein said controlling step comprises a transmission step which sends to another apparatus an amount of data which corresponds to an amount of at least the first data from data stored in the storage medium when a difference between an amount of unrecorded storage capacity of the storage medium and an amount of the first data is less than the predetermined value.

15. A method according to claim 14, wherein said data generating step comprises an image pickup step and generates image data picked up in the image pickup step as the second data.

16. A method according to claim 15, wherein said image pickup step has a plurality of operation modes each relating to a definition of an image to be photographed; and wherein said controlling step comprises a processing step which, for each operating mode, processes the predetermined value in such a way that the predetermined value may be larger than at least a data amount of an image according to the operating mode.

17. A method according to claim 14, further comprising the steps of:

selecting data to be sent; and sending data selected in said selecting step.

18. A method according to claim 14, wherein said data generating step comprises a step of accepting a manual instruction from a user for data generation.

19. A storage medium which stores a computer readable program for implementing information processing, said program comprising the steps of:

receiving data;

generating data; and controlling recording of first data received in said data receiving step and second data generated in said data generating step in a storage medium;

wherein said controlling step controls recording of the first data into the storage medium in such a way that the second data may be stored in an unrecorded storage region of the storage medium when the first data is received, and wherein said controlling step comprises a transmission step which sends to a transmission side apparatus an instruction that the first data is to be transferred to another apparatus when a difference between an amount of an unrecorded storage capacity of the storage medium and an amount of the first data is less than a predetermined value.

20. An image pickup apparatus comprising said information processing apparatus according to claim 1.

21. An image pickup apparatus comprising said information processing apparatus according to claim 5.

22. A storage medium which stores a computer readable program for implementing information processing, said program comprising the steps of:

receiving data;

generating data; and controlling recording of first data received in said data receiving step and second data generated in said data generating step in a storage medium, wherein said controlling step controls recording of the first data into the storage medium in such a way that the second data may be stored in an unrecorded storage region of the storage medium when the first data is received, and wherein said controlling step comprises a transmission step which sends to another apparatus an amount of data which corresponds to an amount of at least the first data from data stored in the storage medium when a difference between an amount of unrecorded storage capacity of the storage medium and an amount of the first data is less than the predetermined value.

23. An information processing apparatus which generates data and records the generated data on a recording medium, comprising:

reception means for receiving data from an external device; and transmission means for transmitting to the external device an indication that the data to be received by said reception means is transmitted to another device, according to a vacant capacity in a case of recording the data received by said reception means on the recording medium.

24. An apparatus according to claim 23, further comprising:

generation means for generating the data; and control means for controlling the recording of the data received by said reception means on the recording medium to record the data generated by said generation means on the recording medium.

25. An information processing method for generating data and recording the generated data on a recording medium, comprising:

a reception step of receiving data from an external device; and a transmission step of transmitting to the external device an indication that the data to be received in said reception step is transmitted to another device, according to a vacant capacity in a case of recording the data received in said reception step on the recording medium.

26. A method according to claim 25, further comprising:

a generation step of generating the data; and a control step of controlling the recording of the data received in said reception step on the recording medium to record the data generated in said generation step on the recording medium.

27. A computer-readable storage medium which stores a program to achieve an information processing method for generating data and recording the generated data on a recording medium, said method comprising:

a reception step of receiving data from an external device; and a transmission step of transmitting to the external device an indication that the data to be received in said reception step is transmitted to another device, according to a vacant capacity in a case of recording the data received in said reception step on the recording medium.

28. A medium according to claim 27, wherein said method further comprises:

a generation step of generating the data; and a control step of controlling the recording of the data received in said reception step on the recording medium to record the data generated in said generation step on the recording medium.

* * * * *

UNITED STATES PATENT AND TRADEMARK OFFICE
CERTIFICATE OF CORRECTION

PATENT NO.    : 6,970,637 B1
DATED         : November 29, 2005
INVENTOR(S)   : Shifeo Yoshida It is certified that error appears in the above-identified patent and that said Letters Patent is hereby corrected as shown below:

<u>Drawings,</u>
Sheet No. 12, Figure 11 of 26, "AUTHENTIFICATION" (both occurrences) should read -- AUTHENTICATION --.
Sheet No. 14, Figure 13 of 26, "AUTHENTIFICATION" (both occurrences) should read -- AUTHENTICATION --.

<u>Column 5,</u>
Line 39, "103," should read -- 108, --.

<u>Column 6,</u>
Line 64, "A/D converter" should read -- A/D converter 215 --.

<u>Column 7,</u>
Line 9, "vertical driver" should read -- vertical driver 217 --.

<u>Column 13,</u>
Line 27, "507" should read -- S507 --.
Line 42, "Example," should read -- For example, --.
Line 62, "setting" should read -- settings --.

<u>Column 18,</u>
Line 43, "POP 3is" should read -- POP 3 is --.
Line 49, "POP 3connection" should read -- POP 3 connection --.

<u>Column 25,</u>
Line 22, "an.input" should read -- an input --.

UNITED STATES PATENT AND TRADEMARK OFFICE
CERTIFICATE OF CORRECTION

PATENT NO. : 6,970,637 B1
DATED : November 29, 2005
INVENTOR(S) : Shifeo Yoshida It is certified that error appears in the above-identified patent and that said Letters Patent is hereby corrected as shown below:

Column 32,
Line 9, "a eighth" should read -- an eighth --.
Line 44, "(step 86380)." should read -- (step S6380). --.

Signed and Sealed this

Sixteenth Day of May, 2006

JON W. DUDAS
*Director of the United States Patent and Trademark Office*